(12) United States Patent
Yakita

(10) Patent No.: US 9,742,969 B2
(45) Date of Patent: Aug. 22, 2017

(54) ATTACHMENT OPTICAL SYSTEM AND IMAGE PICKUP SYSTEM INCLUDING THE SAME

(71) Applicant: CANON KABUSHIKI KAISHA, Tokyo (JP)

(72) Inventor: Shinichiro Yakita, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/149,921

(22) Filed: May 9, 2016

(65) Prior Publication Data

US 2016/0337563 A1    Nov. 17, 2016

(30) Foreign Application Priority Data

May 14, 2015    (JP) ................. 2015-098794

(51) Int. Cl.
| | | |
|---|---|---|
| *H04N 5/232* | (2006.01) | |
| *H04N 5/225* | (2006.01) | |
| *G06K 9/00* | (2006.01) | |
| *G02B 13/00* | (2006.01) | |

(52) U.S. Cl.
CPC ....... *H04N 5/2254* (2013.01); *H04N 5/23209* (2013.01)

(58) Field of Classification Search
CPC ............. H04N 5/2254; H04N 5/23209; H04N 5/23212; G02B 13/0015; G06K 9/00
USPC ............. 348/375, 335, 222.1, 223.1, 333.12, 348/345–356; 382/246, 162, 167, 255; 359/684, 754, 557, 749–753
See application file for complete search history.

(56) References Cited

U.S. PATENT DOCUMENTS

| | | | | |
|---|---|---|---|---|
| 8,208,059 B2 * | 6/2012 | Nakamura | ............. | H04N 5/225 348/224.1 |
| 9,077,842 B2 * | 7/2015 | Natsume | ................ | G03B 17/00 |
| 9,104,017 B2 | 8/2015 | Yakita | | |

(Continued)

FOREIGN PATENT DOCUMENTS

| | | |
|---|---|---|
| JP | S62-194787 A | 8/1987 |
| JP | 5279934 B2 | 9/2013 |
| JP | 2014-170043 A | 9/2014 |

*Primary Examiner* — Tuan Ho
*Assistant Examiner* — Marly Camargo
(74) *Attorney, Agent, or Firm* — Carter, DeLuca, Farrell & Schmidt, LLP

(57) ABSTRACT

An attachment optical system detachably mounted between a lens system and an image pickup apparatus, includes: a receiver receiving first information for correcting lateral chromatic aberrations caused by the lens system; a computer deriving, based on the first information and optical characteristics of the attachment optical system, second information for correcting lateral chromatic aberrations; and a transmitter transmitting the second information to the image pickup apparatus, in which the first and second information include information for obtaining lateral chromatic aberration amounts under conditions of zoom, focus and f-number, based on ratio of image height to maximum image height, in which the first and second information indicate shift amounts of blue/red relative to green radially about optical axis, and in which the shift amounts of blue/red in the first information and in the second information are properly set as functions of ratio of image height to maximum image height.

20 Claims, 15 Drawing Sheets

(56) References Cited

U.S. PATENT DOCUMENTS

| | | | | |
|---|---|---|---|---|
| 2008/0007630 A1* | 1/2008 | Hara | ................ | H04N 9/045 |
| | | | | 348/223.1 |
| 2009/0009633 A1* | 1/2009 | Suto | ................ | H04N 9/045 |
| | | | | 348/241 |
| 2009/0202171 A1* | 8/2009 | Kasahara | ............ | H04N 5/217 |
| | | | | 382/275 |
| 2009/0263018 A1* | 10/2009 | Murakami | ............ | G06T 3/0093 |
| | | | | 382/167 |

* cited by examiner

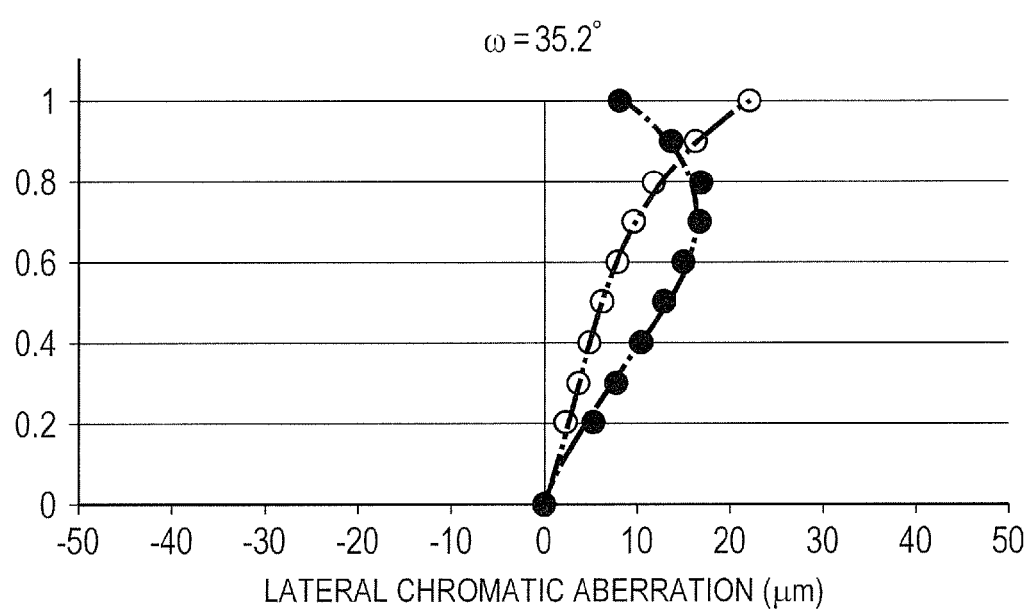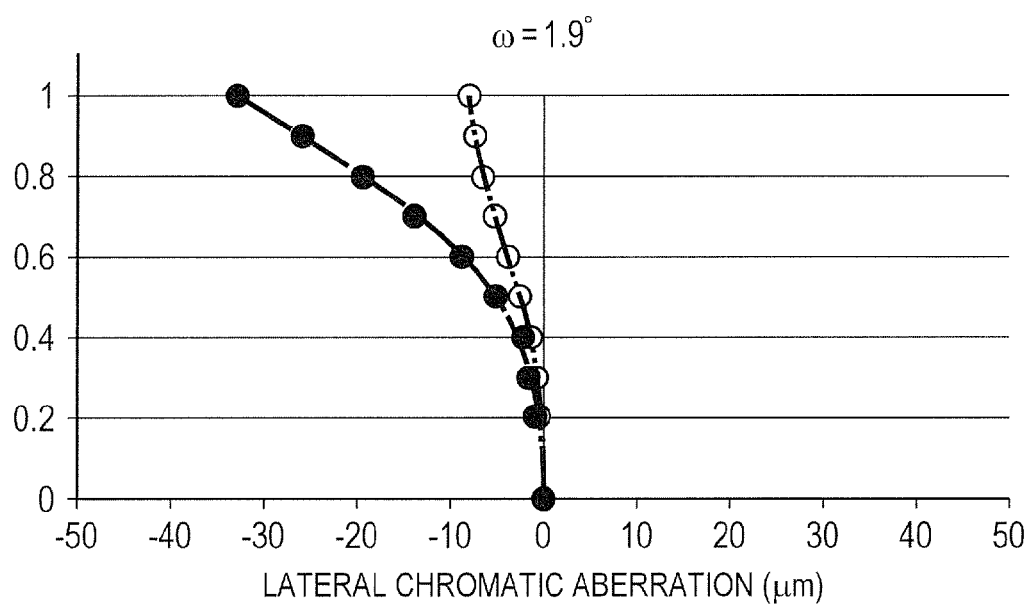

ω = 35.2°

LATERAL CHROMATIC ABERRATION (μm)

ω = 1.9°

LATERAL CHROMATIC ABERRATION (μm)

ω = 35.2°

ω = 1.9°

ω = 35.2°

LATERAL CHROMATIC ABERRATION (μm)

ω = 1.9°

LATERAL CHROMATIC ABERRATION (μm)

ω = 35.2°

LATERAL CHROMATIC ABERRATION (μm)

ω = 1.9°

LATERAL CHROMATIC ABERRATION (μm)

ω = 35.2°
LATERAL CHROMATIC ABERRATION (μm)

ω = 1.9°
LATERAL CHROMATIC ABERRATION (μm)

ATTACHMENT OPTICAL SYSTEM AND IMAGE PICKUP SYSTEM INCLUDING THE SAME

BACKGROUND OF THE INVENTION

Field of the Invention

The present invention relates generally to an attachment optical system to be detachably mounted between an image pickup optical system and an image pickup apparatus to change a focal length, or an image pickup apparatus, which includes a focal length changing optical system. The present invention relates particularly to an attachment optical system to be used in television cameras for broadcasting, video cameras, digital still cameras, silver film cameras, and the like, which is suitable to change lateral chromatic aberration correction data for digital aberration correction through predetermined computation and transmit the data to the main body of an image pickup apparatus, and an image pickup system, which includes the attachment optical system. The present invention alternatively relates to an image pickup apparatus configured to change, through predetermined computation, lateral chromatic aberration correction data that is obtained from an image pickup optical system, and an image pickup system, which includes the image pickup apparatus.

Description of the Related Art

Attachment optical systems of the related art, which can be mounted onto the image plane side of an image pickup optical system, are mounted when the photographic field of view is to be changed by changing the focal length of the image pickup optical system onto which the attachment optical system is mounted, or when an image is picked up with an image pickup apparatus that is incompatible with the image circle diameter of the image pickup optical system. There is disclosed in Japanese Patent Application Laid-Open No. 2014-170043 a lens that is designed on the premise that the lens is to be used in combination with a color separation prism and that allows the use of a single-chip color camera in combination with a photographing lens for a three-chip camera.

Color image pickup apparatus reproduce a color image by overlaying a channel R (red) image, a channel G (green) image, and a channel B (blue) image on top of one another. When an image of a subject is formed on an image pickup element through an image pickup optical system, a phenomenon occurs in which images of the channels R, G, and B are shifted with one another due to a lateral chromatic aberration of a lens. Various methods have been proposed to correct the shift electrically. A replacement lens suitable for lens-replaceable systems is disclosed in Japanese Patent No. 5279934.

In Japanese Patent Application Laid-Open No. S62-194787, there is disclosed a color television camera that uses a lens with a built-in extender function to shift the focal length. The camera disclosed in Japanese Patent Application Laid-Open No. S62-194787 does not need to reset the distortion correction amount each time extender settings are switched because a distortion correction amount optimum for the extender switching state is output to make an adjustment with respect to a subject for which image pickup conditions change constantly, and switching extender settings does not break the adjusted state prior to the switching.

The lateral chromatic aberration of an image pickup optical system changes when a focal length changing optical system, such as an attachment optical system, is mounted onto the image pickup optical system. This gives rise to a problem in that lateral chromatic aberration is not corrected satisfactorily, or even worsens in some cases, when lateral chromatic aberration correction data that is stored in an image pickup optical system in advance is used as it is to make a digital aberration correction in a system where a focal length changing optical system is mounted onto the image pickup optical system.

SUMMARY OF THE INVENTION

It is therefore an object of the present invention to provide an attachment optical system with which optimum lateral chromatic aberration correction data can be transmitted to an image pickup apparatus such as a camera with a simple configuration in an image pickup system that has on the image side of an image pickup optical system a focal length changing optical system, and an image pickup system, which includes the attachment optical system, or to provide an image pickup apparatus, which includes an optical system equivalent to the attachment optical system and an image pickup system, which includes the image pickup apparatus.

According to one embodiment of the present invention, an attachment optical system to be detachably mounted between an image pickup optical system and an image pickup apparatus, includes:

a receiver configured to receive first information for correcting lateral chromatic aberrations that are caused by the image pickup optical system;

a computing unit configured to derive, based on the first information and optical characteristics of the attachment optical system, second information for correcting lateral chromatic aberrations; and a transmitter configured to transmit the second information to the image pickup apparatus, in which the first information and the second information include information for obtaining lateral chromatic aberration amounts under conditions regarding a zoom position, focus position, and f-number of the image pickup optical system, based on a ratio of an image height to be corrected on an image plane to a maximum image height, in which the first information and the second information each indicate shift amounts of blue and red relative to green in a radial direction of a circle centered about an optical axis position, and in which the shift amount of blue $B_{1B}(r)$ relative to green in the second information, the shift amount of red $B_{1R}(r)$ relative to green in the second information are derived as follows:

$$B_{1B}(r) = K \times A_{1B}(r) + C_{1B}(r)$$

$$B_{1R}(r) = K \times A_{1R}(r) + C_{1R}(r)$$

where K represents a predetermined constant that is set in advance to the computing unit, r represents the ratio of the image height to be corrected on the image plane to the maximum image height, $A_{1B}(r)$ represents the shift amount of blue relative to green in the first information, $A_{1R}(r)$ represents the shift amount of red relative to green in the first information, and $C_{1B}(r)$ and $C_{1R}(r)$ respectively represent functions that have r as a variable.

According to another embodiment of the present invention, an attachment optical system to be detachably mounted between an image pickup optical system and an image pickup apparatus, includes:

a receiver configured to receive first information for correcting lateral chromatic aberrations that are caused by the image pickup optical system;

a computing unit configured to derive, from the first information and from optical characteristics of the attachment optical system, second information for correcting lateral chromatic aberrations; and a transmitter configured to transmit the second information to the image pickup apparatus, in which the first information includes information for obtaining lateral chromatic aberration amounts under conditions regarding a zoom position, focus position, and f-number of the image pickup optical system, based on an image height on an image plane of the image pickup optical system, in which the second information includes lateral chromatic aberration amounts that are expressed based on an image height on an image plane of the image pickup optical system with the attachment optical system mounted onto the image pickup optical system, in which the first information and the second information each indicate shift amounts of blue and red relative to green in a radial direction of a circle centered about an optical axis position, and in which, when a predetermined constant that is set in advance to the computing unit is given as K, the image height on the image plane of the image pickup optical system with the attachment optical system mounted onto the image pickup optical system, or an image plane of the image pickup apparatus that includes an optical system configured to change a focal length of the image pickup optical system is given as y', the shift amounts of blue and red relative to green in the first information are given as $A_{2B}(y')$ and $A_{2R}(y')$, respectively, the shift amounts of blue and red relative to green in the second information are given as $B_{2B}(y')$ and $B_{2R}(y')$, respectively, and functions that have y' as a variable are given as $C_{2B}(y')$ and $C_{2R}(y')$, the shift amounts $B_{2B}(y')$ and $B_{2R}(y')$ are derived as follows:

$$B_{2B}(y')=K \times A_{2B}(y'/K)+C_{2B}(y')$$

$$B_{2R}(y')=K \times A_{2R}(y'/K)+C_{2R}(y')$$

Alternatively, in order to achieve the above-mentioned object, according to one embodiment of the present invention, an image pickup apparatus, includes a focal length changing optical system between an image pickup optical system and an image pickup element, the focal length changing optical system being configured to change a focal length of the image pickup optical system, the image pickup optical system being detachable, the image pickup apparatus further includes:

a receiver configured to receive first information for correcting lateral chromatic aberrations that are caused by the image pickup optical system; and a computing unit configured to derive, from the first information and from optical characteristics of the focal length changing optical system, second information for correcting lateral chromatic aberrations.

According to the present invention, in the attachment optical system detachable to the image side of the image pickup optical system and in the image pickup apparatus including an optical system equivalent to the attachment optical system, it is possible to provide the attachment optical system and the image pickup system, which includes the attachment optical system, or the image pickup apparatus, which includes an optical system equivalent to the attachment optical system and the image pickup system, which includes the image pickup apparatus, capable of computing optimum lateral chromatic aberration correction data with a simple configuration.

Further features of the present invention will become apparent from the following description of exemplary embodiments with reference to the attached drawings.

BRIEF DESCRIPTION OF THE DRAWINGS

FIG. 7A is a graph for showing measured values and calculated values of lateral chromatic aberration of the image pickup optical system according to Numerical Embodiment 1-1 of the present invention at the wide angle end when focused to infinity in Embodiment 1 and Embodiment 2.

FIG. 7B is a graph for showing measured values and calculated values of lateral chromatic aberration of the image pickup optical system according to Numerical Embodiment 1-1 of the present invention at the telephoto end when focused to infinity in Embodiment 1 and Embodiment 2.

DESCRIPTION OF THE EMBODIMENTS

Figure 1:
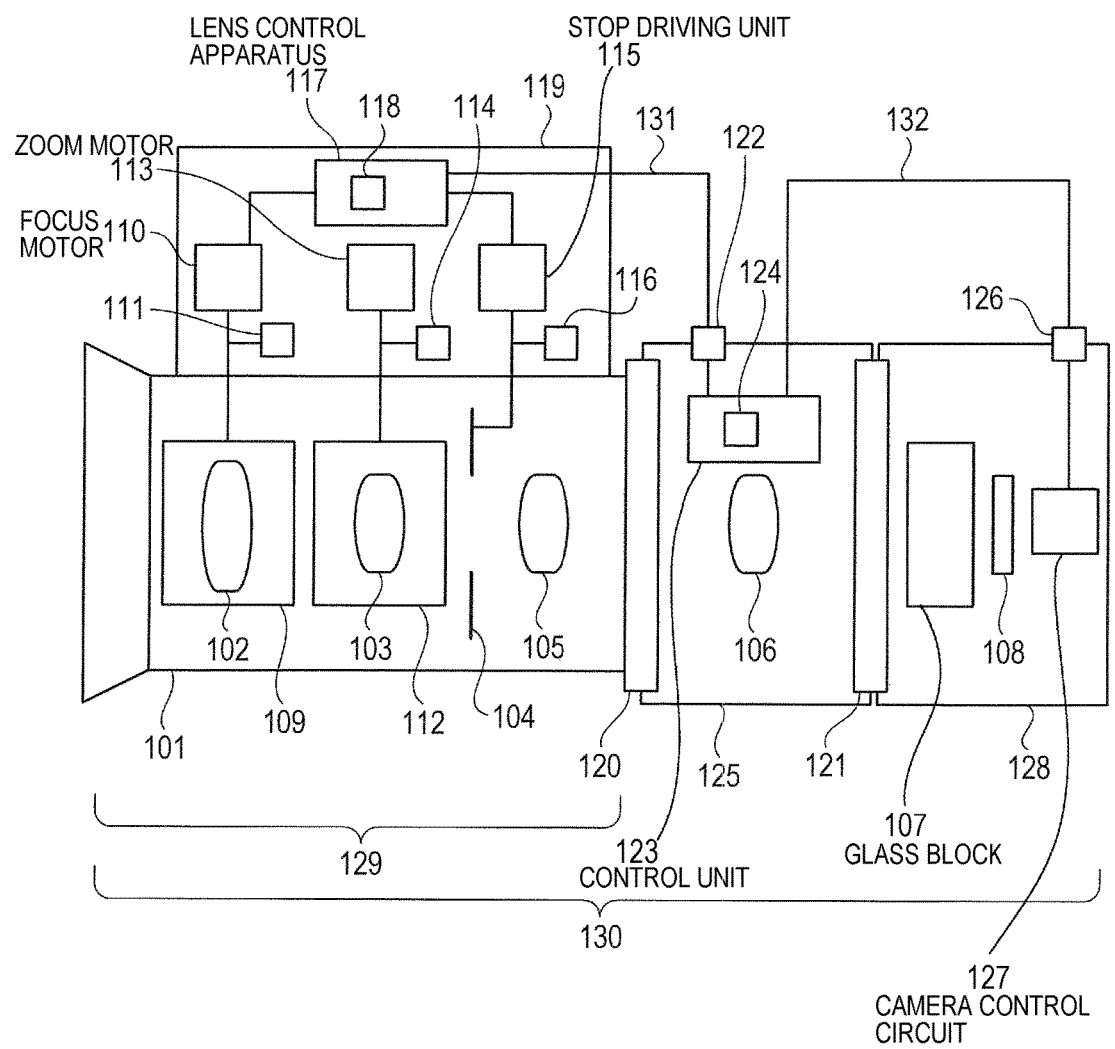
FIG. 1 is a schematic diagram of an image pickup system that includes an attachment optical system according to the present invention.

Further features of the present invention will become apparent from the following description of exemplary embodiments with reference to the attached drawings. The configurations of a focal length changing optical system and an image pickup apparatus according to the present invention are outlined below.

The image pickup system of the present invention includes, from the object side in order, an image pickup optical system, a focal length changing optical system, and an image pickup element. The focal length changing optical system may be mounted between the image pickup optical system and an image pickup apparatus in a manner that allows the focal length changing optical system to be detached from the image pickup optical system and from the image pickup apparatus, or may be included in the image pickup apparatus, which includes the image pickup element.

The image pickup system also includes a receiver and a computing unit. The receiver receives pieces of lateral chromatic aberration correction data (first information) $A_B$ and $A_R$, which are stored in advance in the image pickup optical system in order to correct lateral chromatic aberrations caused by the image pickup optical system. The computing unit calculates (derives) new lateral chromatic aberration correction data (second information) $B_B$ and $B_R$ for correcting lateral chromatic aberrations that are caused by the image pickup optical system and the focal length changing optical system, based on the lateral chromatic aberration correction data (first information) $A_B$ and $A_R$ and on the optical characteristics of the focal length changing optical system. The suffix "B" in lateral chromatic aberration correction data represents the shift amount between the blue channel and the green channel, and the suffix "R" represents the shift amount between the red channel and the green channel. The represented shift amounts indicate the shift amounts in a radial direction of a circle that is centered about the optical axis position.

It is preferred for the focal length changing optical system to include a memory configured to store the lateral chromatic aberration correction data $B_B$ and $B_R$. This requires less frequent execution of computation processing, thereby improving the processing speed of the image pickup system.

It is also preferred to express the lateral chromatic aberration correction data $A_B$, $A_R$, $B_B$, and $B_R$ as functions $A_{1B}(r)$, $A_{1R}(r)$, $B_{1B}(r)$, and $B_{1R}(r)$, which are for obtaining lateral chromatic aberration amounts under conditions regarding the zoom position, focus position, and f-number of the image pickup apparatus, based on a ratio (proportion) r of an image height to be corrected on the image plane to the maximum image height. In other words, each of the lateral chromatic aberration correction data $A_{1B}(r)$, $A_{1R}(r)$, $B_{1B}(r)$, and $B_{1R}(r)$ represents the shift amount in a radial direction of a circle that is centered about the optical axis position, at an image height point that has a ratio of r to the maximum image height. This way, a lateral chromatic aberration correction amount at an arbitrary image height point can be obtained with a small data capacity.

When a predetermined constant that is set in advance to a computing unit of the focal length changing optical system is given as K, the ratio of an image height to be corrected on the image plane to the maximum image height is given as r, and functions that have r as a variable are given as $C_{1B}(r)$ and $C_{1R}(r)$, it is preferred for the computing unit to calculate the lateral chromatic aberration correction data $B_{1B}(r)$ and $B_{1R}(r)$ by Expressions (1) and (2), respectively.

$$B_{1B}(r) = K \times A_{1B}(r) + C_{1B}(r) \tag{1}$$

$$B_{1R}(r) = K \times A_{1R}(r) + C_{1R}(r) \tag{2}$$

Alternatively, it is preferred to express the lateral chromatic aberration correction data $A_B$ and $A_R$ as functions $A_{2B}(y)$ and $A_{2R}(y)$, which indicate lateral chromatic aberration amounts under conditions regarding the zoom position, focus position, and f-number of the image pickup apparatus, based on an image height y on the image plane of the image pickup optical system, and to express the lateral chromatic aberration correction data $B_B$ and $B_R$ as functions $B_{2B}(y')$ and $B_{2R}(y')$, which indicate lateral chromatic aberration amounts based on an image height y' on the image plane of the image pickup optical system with the focal length changing optical system mounted thereon. This way, a lateral chromatic aberration correction amount at an arbitrary image height point can be obtained with a small data capacity.

When a predetermined constant that is set in advance to the computing unit of the focal length changing optical system is given as K, and functions that have as a variable the image height y' on the image plane of the image pickup optical system with the focal length changing optical system mounted thereon are given as $C_{2B}(y')$ and $C_{2R}(y')$, it is preferred for the computing unit to calculate the lateral chromatic aberration correction data $B_{2B}(y')$ and $B_{2R}(y')$ by Expressions (3) and (4), respectively.

$$B_{2B}(y')=K \times A_{2B}(y'/K)+C_{2B}(y') \quad (3)$$

$$B_{2R}(y')=K \times A_{2R}(y'/K)+C_{2R}(y') \quad (4)$$

The reason why the calculation by Expressions (1) and (2) or Expressions (3) and (4) is preferred is described. When the lateral chromatic aberration amount of the image pickup optical system is given as $\Delta_o$ and the lateral magnification of the focal length changing optical system is given as $\beta_a$, a lateral chromatic aberration amount $\Delta_{oa}$ of the image pickup optical system with the focal length changing optical system mounted thereon can approximately be expressed by Expression (5).

$$\Delta_{oa} \approx \Delta_o \times \beta_a \quad (5)$$

This is based on an approximation theory called a paraxial theory, which is established by limiting the area of passage of a light ray to an extremely narrow area in the vicinity of the optical axis of an optical system. The paraxial theory works in an area where Expressions (6), (7), and (8) are true.

$$\sin \theta \approx \theta \quad (6)$$

$$\tan \theta \approx \theta \quad (7)$$

$$\cos \theta \approx 1 \quad (8)$$

However, the actual lateral chromatic aberration amount deviates from a value calculated by Expression (5) because, in an actual image pickup optical system and an actual focal length changing optical system, a high-order aberration may occur outside the area where Expressions (6) through (8) are true, and the focal length changing optical system has a unique lateral chromatic aberration. The constant K in Expressions (1) and (2) or Expressions (3) and (4) is for performing approximation that takes into account $\beta_a$ in Expression (5), and the functions $C_B$ and $C_R$ are for taking into account the amount of lateral chromatic aberration unique to the focal length changing optical system. Lateral chromatic aberration correction data high in correction precision can thus be computed by simple computation.

It is also preferred to satisfy Expression (9), which is a conditional expression, when the focal length of the image pickup optical system is f1 at the wide angle end, and the focal length of the image pickup system with the focal length changing optical system mounted onto the image pickup optical system is f2 at the wide angle end.

$$0.8 < K \times f1/f2 < 1.2 \quad (9)$$

The term f1/f2 in Expression (9) corresponds to $\beta_a$, and defines a relationship to the constant K. The precision of correction with the lateral chromatic aberration correction data deteriorates outside the range of Expression (9) for the reasons given above.

When the receiver does not receive the lateral chromatic aberration correction data $A_{1B}(r)$ and $A_{1R}(r)$, it is preferred for the computing unit to calculate the lateral chromatic aberration correction data $B_{1B}(r)$ and $B_{1R}(r)$ by Expressions (10) and (11), respectively.

$$B_{1B}(r)=C_{1B}(r) \quad (10)$$

$$B_{1R}(r)=C_{1R}(r) \quad (11)$$

Alternatively, when the receiver does not receive the lateral chromatic aberration correction data $A_{2B}(y)$ and $A_{2R}(y)$, it is preferred for the computing unit to calculate the lateral chromatic aberration correction data $B_{2B}(y')$ and $B_{2R}(y')$ by Expressions (12) and (13), respectively.

$$B_{2B}(y')=C_{2B}(y') \quad (12)$$

$$B_{2R}(y')=C_{2R}(y') \quad (13)$$

With Expressions (10) and (11) or Expressions (12) and (13), at least the amount of lateral chromatic aberration unique to the focal length changing optical system can be corrected.

It is also preferred to allow a user to change the constant K to an arbitrary value. This way, the user can set a desired degree of correction at the user's discretion.

By the measures described above, lateral chromatic aberration correction that is favorable throughout the entire focal length range, entire focus range, and entire aperture range of an image pickup system is accomplished despite a focal length changing optical system mounted onto the image pickup optical system.

Embodiment 1

FIG. 1 is a diagram for illustrating, as Embodiment 1 of the present invention, the configuration of an image pickup system that includes an attachment optical system. In FIG. 1, an image pickup apparatus 128 is a television camera, a video camera, or the like, and an image pickup optical system 101 is a zoom lens or the like. An attachment optical system 125 is mounted onto the image pickup optical system 101 when the focal length of the mounted image pickup optical system is to be changed to change the photographic field of view, or when an image is picked up with an image pickup apparatus that is incompatible with the image circle diameter of the image pickup optical system. The attachment optical system 125 is detachably mounted onto the image pickup optical system 101 via a mount 120, and is detachably mounted onto the image pickup apparatus 128 via a mount 121.

A drive unit (control apparatus) 119 is mounted onto the image pickup optical system 101. The image pickup optical system 101 and the drive unit 119 make up an image pickup optical system-based system 129.

The image pickup optical system-based system 129, the attachment optical system 125, and the image pickup apparatus 128 make up an image pickup system 130.

Power is supplied to the attachment optical system 125 via a cable 132 (or a contact point connector (not shown) connected when the attachment optical system 125 is joined to the image pickup apparatus 128). The image pickup optical system-based system 129 receives a supply of power from the image pickup apparatus 128 via the cable 132 and a cable 131 (or a contact point connector (not shown) connected when the attachment optical system 125 is joined to the image pickup optical system 101). The cable 131 is used to connect the attachment optical system 125 and the drive unit 119.

In the image pickup optical system 101, a focus lens unit 102 is movable in an optical axis direction for focusing, a variable power lens unit 103 is movable in an optical axis direction for a change in magnification, a stop unit 104 is configured to change the aperture diameter in order to adjust the amount of light, and a lens unit 105 is for image forming.

The lens units 102, 103, and 105 and the stop unit 104 make up the image pickup optical system 101.

A focus driving mechanism 109 is a helicoid or the like configured to drive the focus lens unit 102 in an optical axis direction. A zoom driving mechanism 112 is a cam or the like configured to drive the variable power lens unit 103 in an optical axis direction.

The focus driving mechanism 109, the zoom driving mechanism 112, and the stop unit 104 can be driven electrically by the drive unit 119 and can also be driven manually.

The drive unit 119 is described. An image pickup optical system control apparatus (lens control apparatus) 117 controls various operations of the drive unit 119. A CPU configured to execute various types of computing processing and a data memory circuit 118 configured to store lateral chromatic aberration correction data, which is described later, are built in the lens control apparatus 117. A focus motor 110 comes into operation in response to a drive signal from the lens control apparatus 117 to drive the focus driving mechanism 109. A zoom motor 113 comes into action in response to a drive signal from the lens control apparatus 117 to drive the zoom driving mechanism 112. The drive unit 119 is provided with a focus position detector 111, which is an encoder, a potentiometer, or the like coupled to the focus driving mechanism 109 in order to detect the position of the focus lens unit 102 on the optical axis. The drive unit 119 is also provided with a zoom position detector 114, which is an encoder, a potentiometer, or the like coupled to the zoom driving mechanism 112 in order to detect the position of the variable power lens unit 103 on the optical axis. A stop driving circuit 115 is configured to drive the stop unit 104 in the image pickup optical system 101 in response to a drive signal from the lens control apparatus 117. A stop position detector 116 is provided in order to detect the aperture amount of the stop unit 104. The cable 131 is used to transmit lateral chromatic aberration correction data from the lens control apparatus 117 to the attachment optical system 125, or to an image pickup apparatus (not shown) that is compatible with the image circle diameter of the image pickup optical system, and is also used by the drive unit 119 to receive a supply of power.

In the attachment optical system 125, an optical system 106 is used when the photographic field of view is changed or when an image is picked up with an image pickup apparatus that has an image size different from the image size of the image pickup optical system. A control unit 123 includes a receiver (not shown) configured to receive lateral chromatic aberration correction data from the lens control apparatus 117, a computing unit (not shown) configured to calculate new lateral chromatic aberration correction data, and a transmitter (not shown) configured to transmit the calculated data to the image pickup apparatus 128. A memory 124 is configured to store lateral chromatic aberration correction data that is newly calculated by the control unit 123. A connection unit 122 is configured to connect the cable 131 to the attachment optical system 125. The cable 132 is used to transmit lateral chromatic aberration correction data calculated by the control unit 123 to the image pickup apparatus 128, and to receive a supply of power from the image pickup apparatus 128.

In the image pickup apparatus 128, a glass block 107 is equivalent to a filter or a color separation prism. An image pickup element 108 is a CCD, a CMOS sensor, or the like configured to perform photoelectric conversion on a subject image that is formed by the image pickup optical system 101 and the attachment optical system 125. A camera control circuit 127 handles control of the image pickup apparatus 128, and has a built-in image processing circuit configured to perform lateral chromatic aberration correction with the use of an image pickup signal obtained from the image pickup element 108 and lateral chromatic aberration correction data obtained from the control unit 123. A connection unit 126 is configured to connect the cable 132 to the image pickup apparatus 128.

Figure 2:
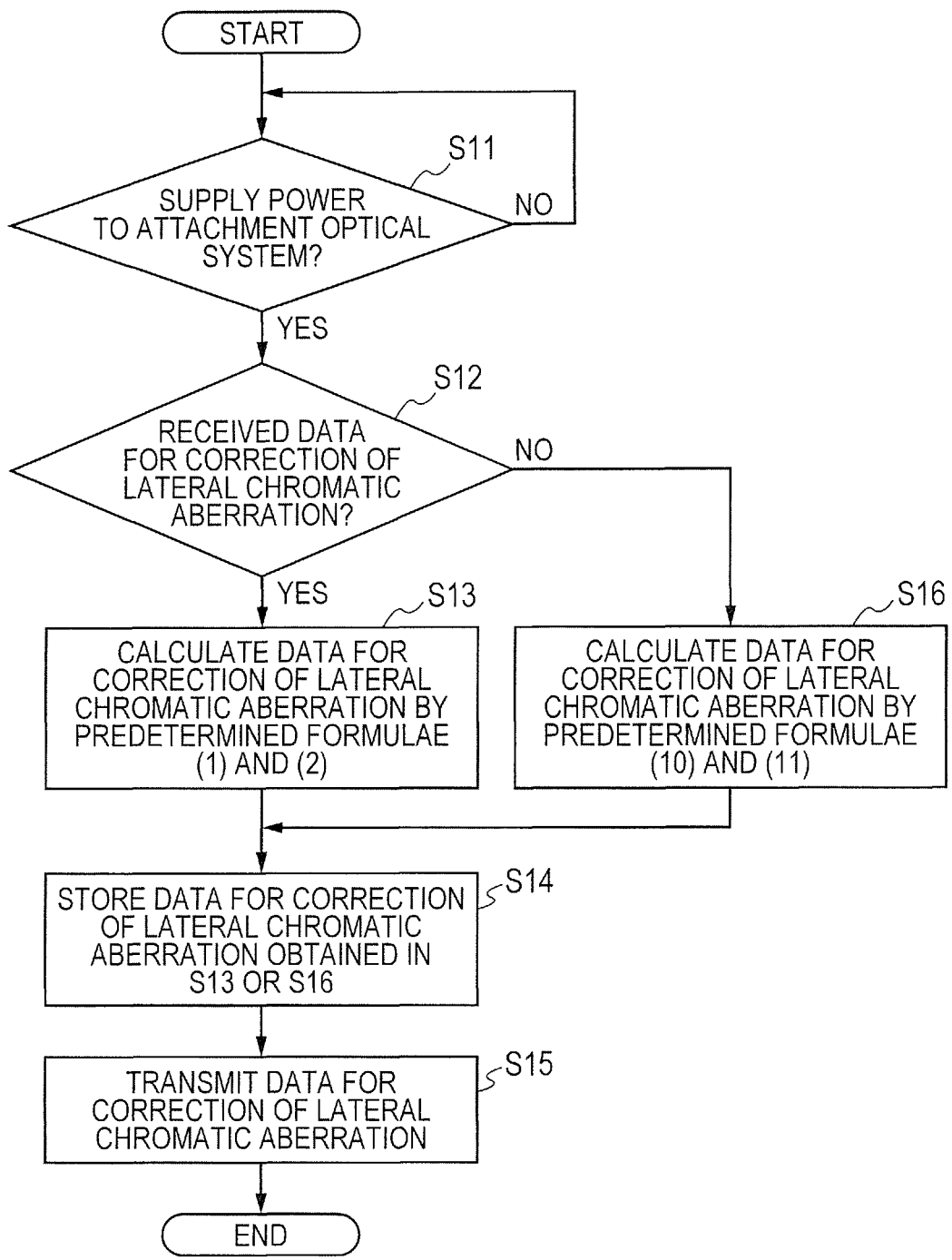
FIG. 2 is a flow chart in Embodiment 1 of the present invention.

FIG. 2 is a flow chart of lateral chromatic aberration correction in the attachment optical system 125 according to Embodiment 1.

In Step (abbreviated as "S" in the drawing) 11, which is the first step, the attachment optical system 125 proceeds to Step 12 in the case where the control unit 123 determines that power has been supplied from the image pickup apparatus 128. In Step 12, whether or not lateral chromatic aberration correction data has been received from the lens control apparatus 117 is determined, and the attachment optical system 125 proceeds to Step 13 in the case where the data has been received. In Step 13, new lateral chromatic aberration correction data is calculated by Expressions (1) and (2), and the attachment optical system 125 then proceeds to Step 14. In Step 14, the lateral chromatic aberration correction data calculated in Step 13 is stored in the memory 124, and the attachment optical system 125 proceeds to Step 15. In Step 15, the lateral chromatic aberration correction data stored in Step 14 is transmitted to the image pickup apparatus 128.

When it is determined in Step 12 that lateral chromatic aberration correction data has not been received, the attachment optical system 125 proceeds to Step 16. In Step 16, lateral chromatic aberration correction data is calculated by Expressions (10) and (11), and the attachment optical system 125 proceeds to Step 14.

Embodiment 2

Figure 3:
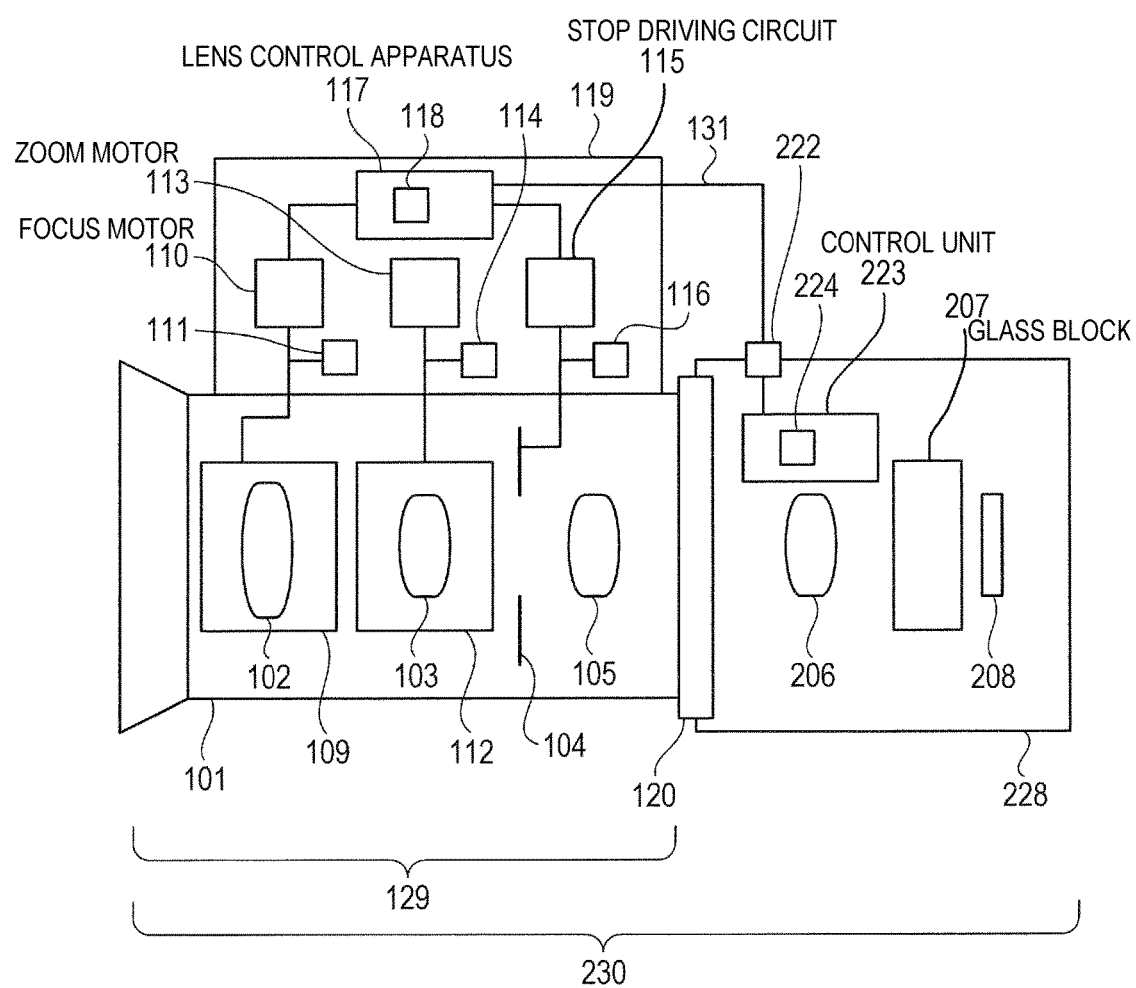
FIG. 3 is a schematic diagram of an image pickup system that includes an image pickup apparatus according to the present invention.

FIG. 3 is a diagram for illustrating, as Embodiment 2 of the present invention, the configuration of an image pickup system that includes a focal length changing optical system. In FIG. 3, an image pickup apparatus 228 is a television camera, a video camera, or the like. An image pickup optical system 101 is a zoom lens or the like. The image pickup optical system 101 is detachably mounted onto the image pickup apparatus 228 via a mount 120. A drive unit (control apparatus) 119 is mounted onto the image pickup optical system 101. The image pickup optical system 101 and the drive unit 119 make up an image pickup optical system-based system 129. The image pickup optical system-based system 129 of FIG. 3 has the same configuration as that of the image pickup optical system-based system illustrated in FIG. 1.

The image pickup optical system-based system 129 and the image pickup apparatus 228 make up an image pickup system 230.

Power is supplied to the image pickup optical system-based system 129 from the image pickup apparatus 228 via a cable 131 (or a contact point connector (not shown) connected when the image pickup optical system 101 is joined to the image pickup apparatus 228). The cable 131 is used to connect the drive unit 119 and the image pickup apparatus 228.

In the image pickup apparatus 228, an optical system 206 is used when the photographic field of view is changed or when an image is picked up with an image pickup apparatus that has an image size different from the image size of the image pickup optical system 101. A control unit 223 handles control of a receiver (not shown) configured to receive lateral chromatic aberration correction data from the lens control apparatus 117, a computing unit (not shown) configured to calculate new lateral chromatic aberration correction data, and the image pickup apparatus 228. A memory 224 is configured to store lateral chromatic aberration correction data that is newly calculated by the control unit 223. An image processing circuit is built in to perform lateral chromatic aberration correction with the use of an image pickup signal obtained from an image pickup element 208 and the calculated lateral chromatic aberration correction data. A connection unit 222 is configured to connect the cable 131 to the image pickup apparatus 228.

A glass block 207 is equivalent to a filter or a color separation prism. The image pickup element 208 is a CCD, a CMOS sensor, or the like configured to perform photoelectric conversion on a subject image that is formed by the image pickup optical system 101 and the optical system 206.

Figure 4:
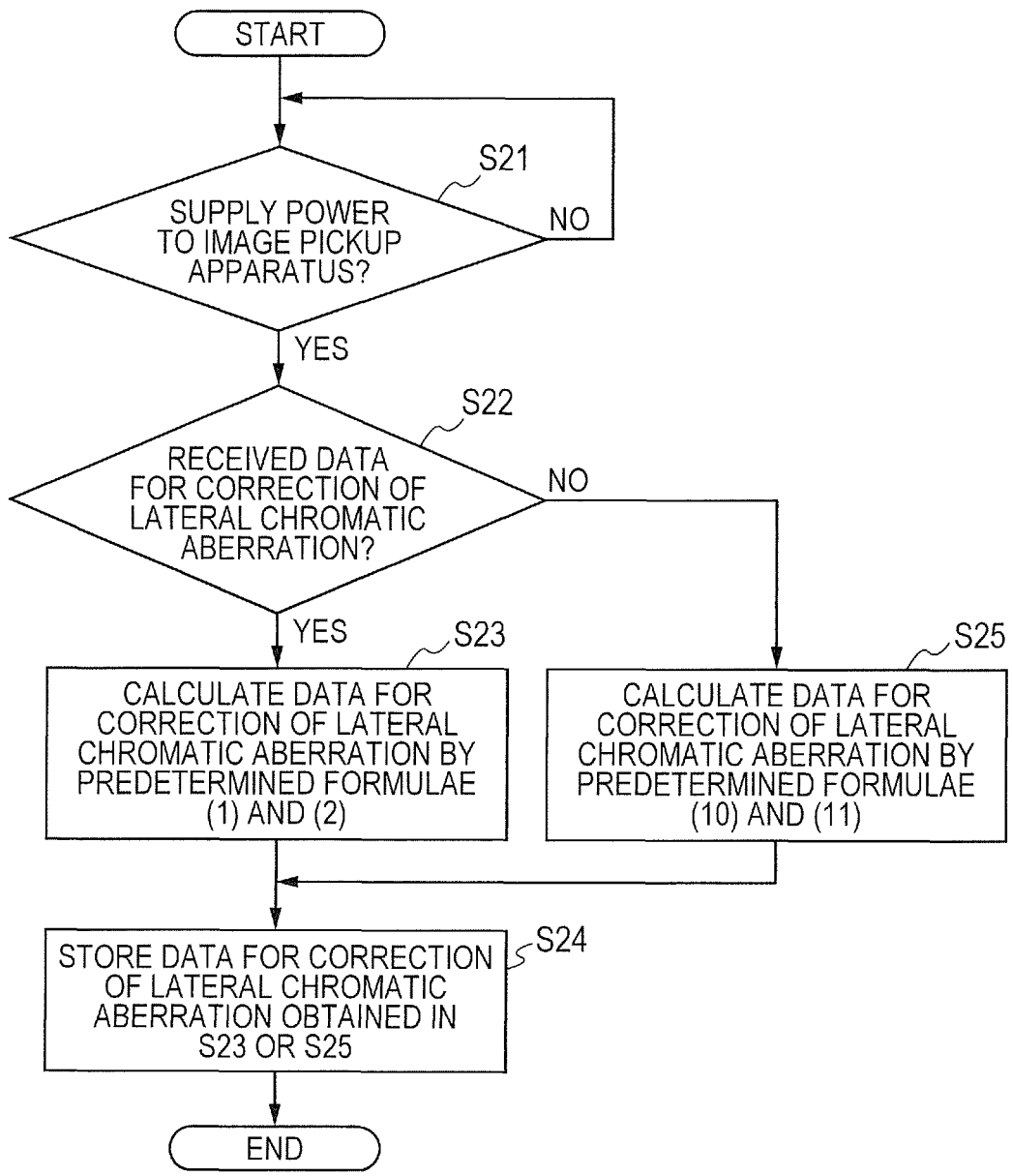
FIG. 4 is a flow chart in Embodiment 2 of the present invention.

FIG. 4 is a flow chart of lateral chromatic aberration correction in the image pickup apparatus 228 according to Embodiment 2.

In Step 21, which is the first step, the image pickup apparatus 228 proceeds to Step 22 in the case where power has been supplied to the image pickup apparatus 228. In Step 22, whether or not lateral chromatic aberration correction data has been received from the lens control apparatus 117 is determined and the image pickup apparatus 228 proceeds to Step 23 in the case where the data has been received. In Step 23, lateral chromatic aberration correction data is calculated by Expressions (1) and (2), and the image pickup apparatus 228 proceeds to Step 24. In Step 24, the lateral chromatic aberration correction data calculated in Step 23 is stored in the memory 224.

When it is determined in Step 22 that lateral chromatic aberration correction data has not been received, the image pickup apparatus 228 proceeds to Step 25. In Step 25, lateral chromatic aberration correction data is calculated by Expressions (10) and (11), and the image pickup apparatus 228 proceeds to Step 24.

Figure 5:
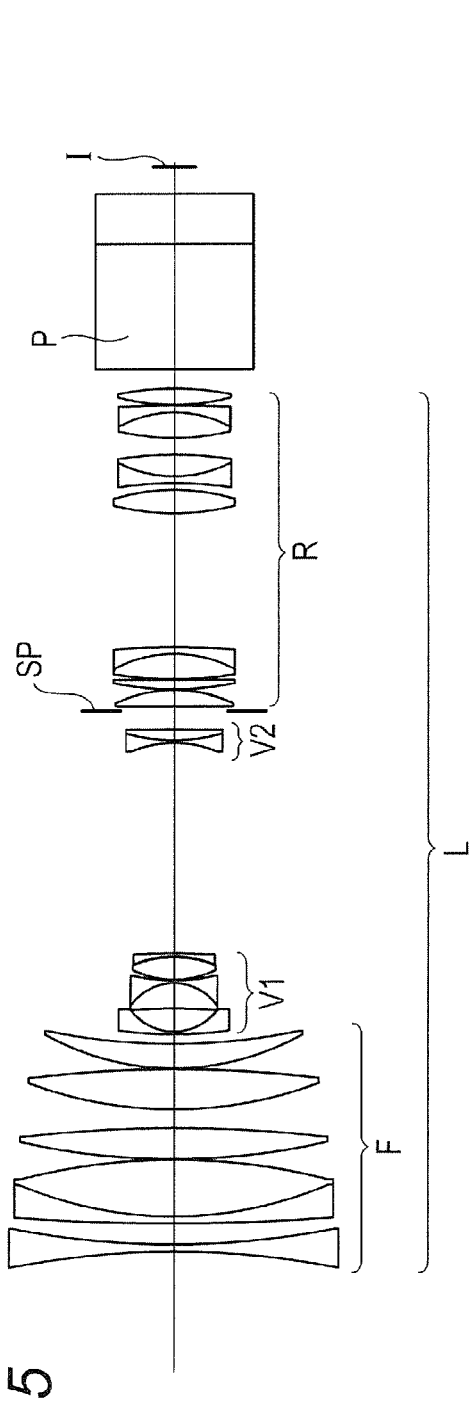
FIG. 5 is a sectional view of an image pickup optical system according to Numerical Embodiment 1-1 of the present invention at the wide angle end when focused to infinity.

FIG. 5 is a diagram for illustrating the optical configuration of the image pickup optical system 101 according to the present invention in the form of a lens sectional view at the wide angle end when the image pickup optical system 101 is focused at an object distance of infinity. An image pickup optical system L, an optical filter, a color separation prism, or the like illustrated as a glass block P, and an image pickup plane I are arranged from the object side to the image side in order. The image pickup optical system L includes, from the object side to the image side in order, a first lens unit F, a second lens unit V1 and a third lens unit V2, which are variable power lens units, a stop SP, and a fourth lens unit R. The first lens unit F is the frontmost lens unit, which has a positive refractive power and which does not move in an optical axis direction for a change in magnification. The second lens unit V1 and the third lens unit V2 as variable power lens units can be moved to change the magnification. The fourth lens unit R is a relay unit the positive refractive power of which has an image forming effect and which does not move when the magnification is changed. The symbol P represents a color separation prism, an optical filter, or the like, and is illustrated as a glass block in FIG. 5. The image pickup plane I corresponds to an image circle diameter (φ) of 11 mm.

Figure 6:
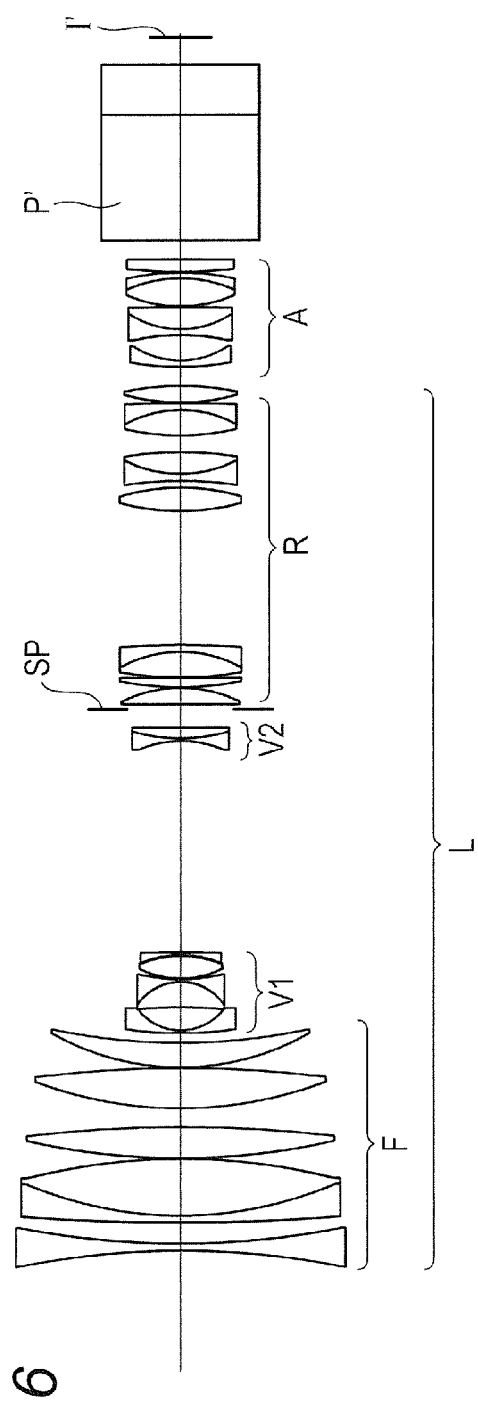
FIG. 6 is a sectional view of an optical system according to Numerical Embodiment 1-2 of the present invention at the wide angle end when focused to infinity.

FIG. 6 is a lens sectional view of an image pickup system that includes a focal length changing optical system according to Embodiment 1 or Embodiment 2 of the present invention at the wide angle end when focused at an object distance of infinity. An image pickup optical system L, a focal length changing optical system A, a color separation prism, an optical filter, or the like illustrated as a glass block P', and an image pickup plane I' are arranged from the object side to the image side in order. The image pickup optical system L of FIG. 6 has the same configuration as that of the image pickup optical system L that is included in the image pickup system of FIG. 5. The focal length changing optical system A is an optical system configured to change the image circle diameter of the image pickup optical system L. The image pickup plane I' corresponds to an image circle diameter (φ) of 15.96 mm. With the focal length changing optical system A interposed, the image pickup optical system L that is designed for the image pickup plane I, which is created when the focal length changing optical system A is not interposed, is made compatible with the image pickup plane I', which has an image circle diameter different from that of the image pickup plane I.

FIG. 7A and FIG. 7B are graphs for showing measured values and calculated values of lateral chromatic aberration in the optical system of FIG. 5 according to Embodiment 1 to which the focal length changing optical system has not been applied yet, at the wide angle end and the telephoto end, respectively, when the optical system is focused at an object distance of infinity. Pieces of lateral chromatic aberration correction data (the dot-dash line and the dot-dot-dash line) are calculated based on Table 1A and Table 1B, which are described later. A filled circle represents a measured value of the amount of deviation of a line g from a line e. An open circle represents a measured value of the amount of deviation of a line C from the line e. As pieces of lateral chromatic aberration correction data that are calculated based on Table 4A and Table 4B, the dot-dash line and the dot-dot-dash line indicate the shift amount of a blue channel relative to a green channel and the shift amount of a red channel relative to the green channel, respectively. This notation method (filled circles, open circles, the dot-dash line, and the dot-dot-dash line) applies also to lateral chromatic aberration graphs described below.

Figure 8A:
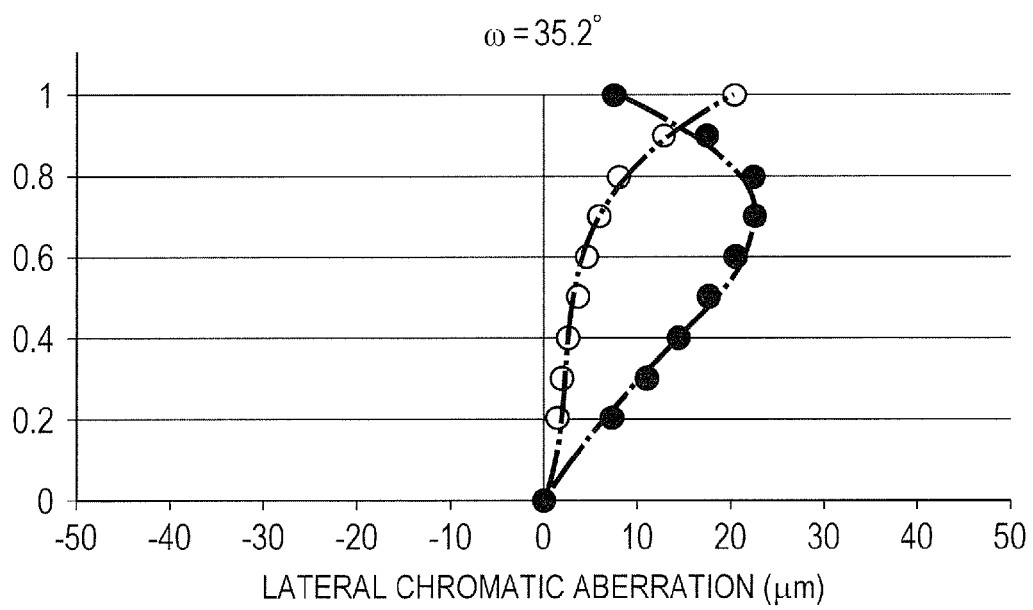
FIG. 8A is a graph for showing measured values and calculated values of lateral chromatic aberration of the image pickup optical system according to Numerical Embodiment 1-1 of the present invention at the wide angle end when focused at an object distance of 0.82 m in Embodiment 1 and Embodiment 2.
Figure 8B:
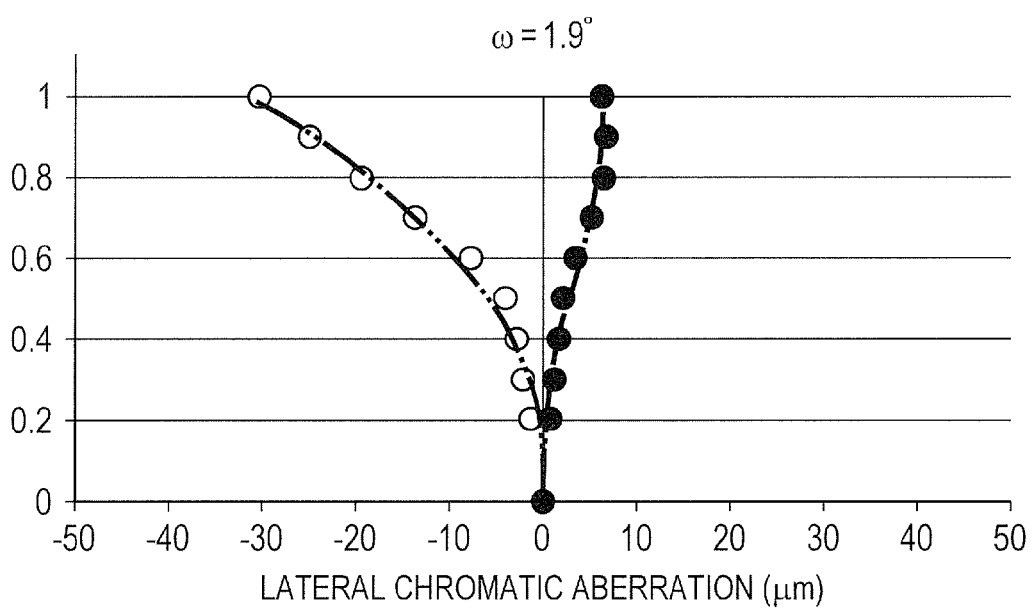
FIG. 8B is a graph for showing measured values and calculated values of lateral chromatic aberration of the image pickup optical system according to Numerical Embodiment 1-1 of the present invention at the telephoto end when focused at an object distance of 0.82 m in Embodiment 1 and Embodiment 2.

FIG. 8A and FIG. 8B are graphs for showing measured values and calculated values of lateral chromatic aberration in the optical system of FIG. 5 to which the focal length changing optical system of Embodiment 1 has not been applied yet, at the wide angle end and the telephoto end, respectively, when the optical system is focused at an object distance of 0.82 m. The object distance is expressed as a distance from the vertex of a lens surface that is closest to the object side among lenses in the first lens unit. Pieces of lateral chromatic aberration correction data (the dot-dash line and the dot-dot-dash line) are calculated based on Table 1A and Table 1B, which are described later.

Figure 9A:
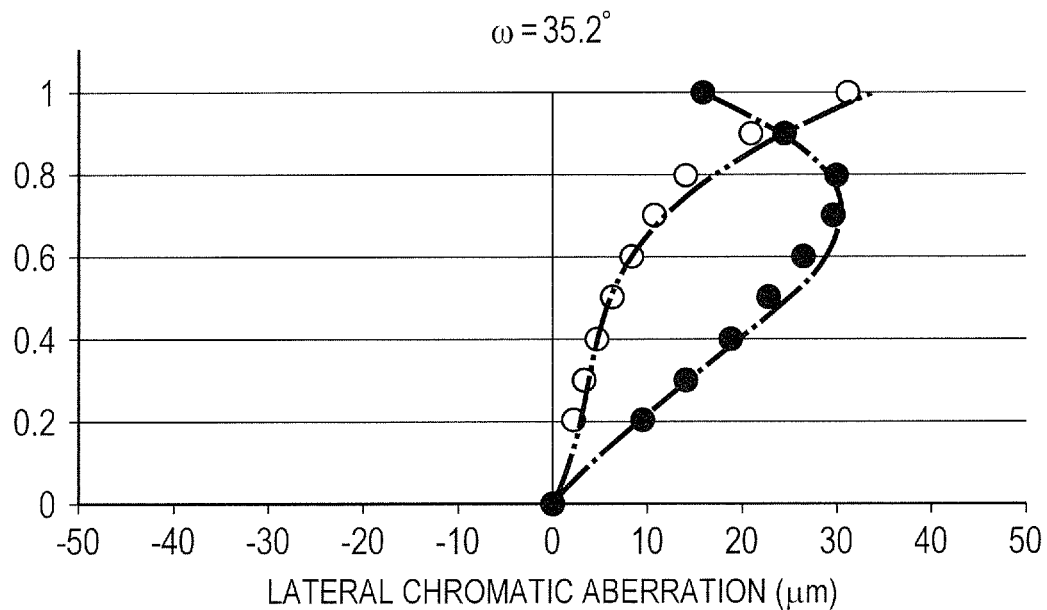
FIG. 9A is a graph for showing measured values and calculated values of lateral chromatic aberration in Numerical Embodiment 1-2 of the present invention at the wide angle end when the optical system is focused to infinity in Embodiment 1 and Embodiment 2.
Figure 9B:
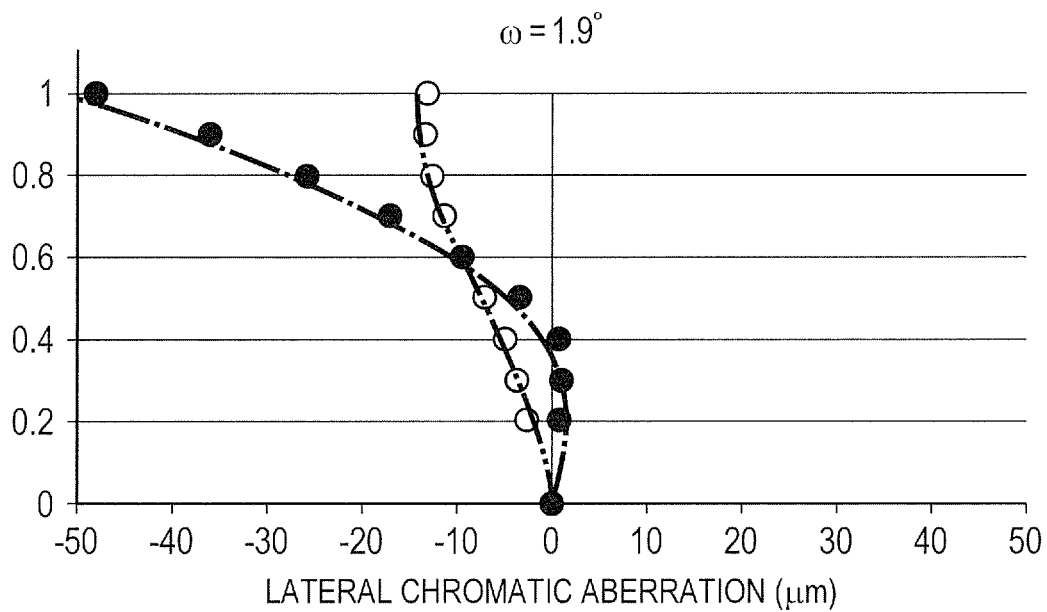
FIG. 9B is a graph for showing measured values and calculated values of lateral chromatic aberration in Numerical Embodiment 1-2 of the present invention at the telephoto end when the optical system is focused to infinity in Embodiment 1 and Embodiment 2.

FIG. 9A and FIG. 9B are graphs for showing measured values and calculated values of lateral chromatic aberration in the optical system of FIG. 6 according to Embodiment 1 or Embodiment 2, at the wide angle end and the telephoto end, respectively, when the optical system is focused at an object distance of infinity.

Figure 10A:
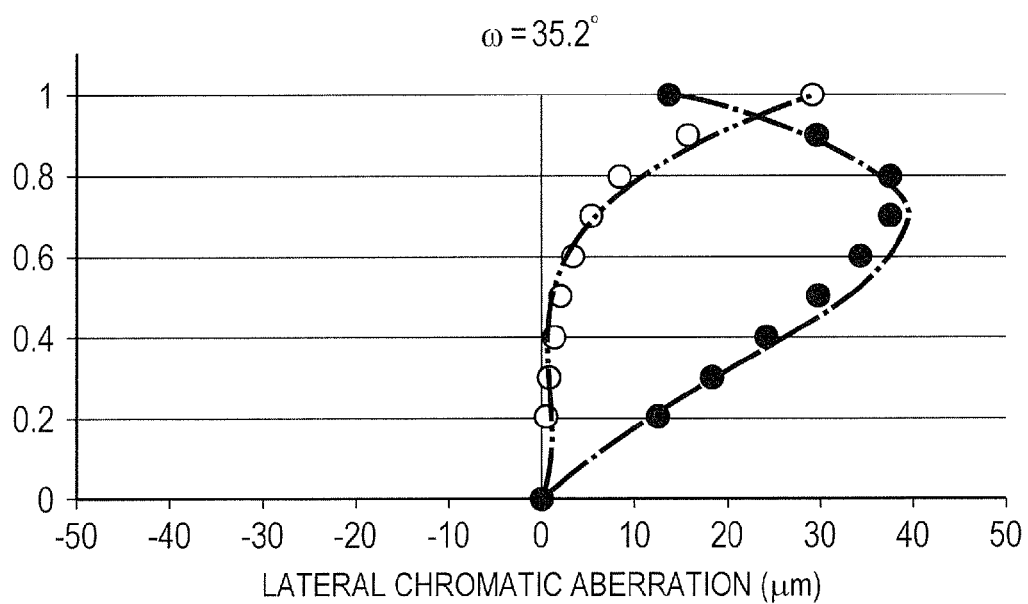
FIG. 10A is a graph for showing measured values and calculated values of lateral chromatic aberration in Numerical Embodiment 1-2 of the present invention at the wide angle end when the optical system is focused at an object distance of 0.82 m in Embodiment 1 and Embodiment 2.
Figure 10B:
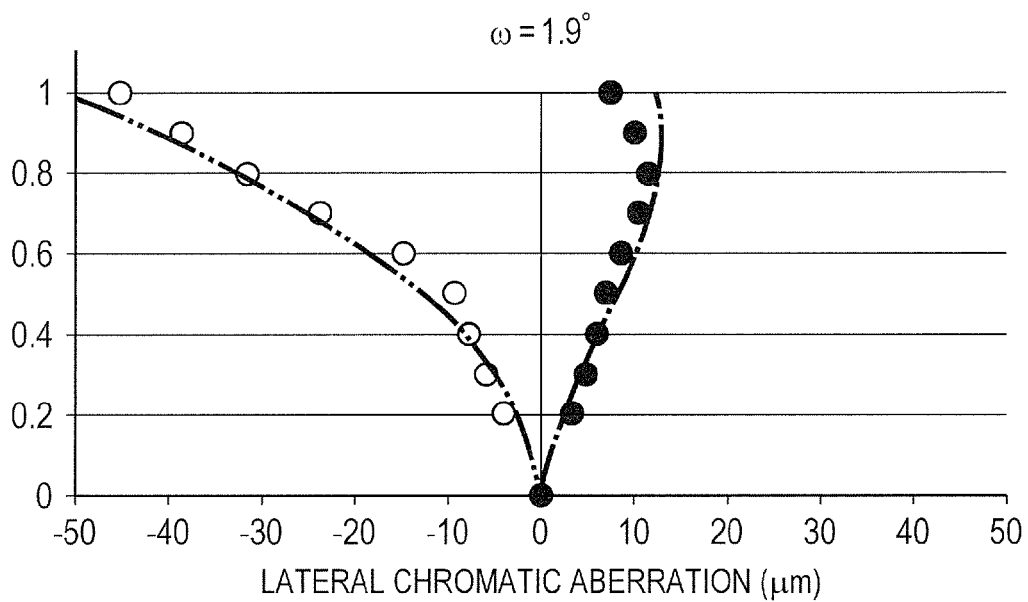
FIG. 10B is a graph for showing measured values and calculated values of lateral chromatic aberration in Numerical Embodiment 1-2 of the present invention at the telephoto end when the optical system is focused at an object distance of 0.82 m in Embodiment 1 and Embodiment 2.

FIG. 10A and FIG. 10B are graphs for showing measured values and calculated values of lateral chromatic aberration in the optical system of FIG. 6 according to Embodiment 1 or Embodiment 2, at the wide angle end and the telephoto end, respectively, when the optical system is focused at an object distance of 0.82 m. The object distance is expressed as a distance from the vertex of a lens surface that is closest to the object side among lenses in the first lens unit. Pieces of lateral chromatic aberration correction data (the dot-dash line and the dot-dot-dash line) are calculated based on Table 4A and Table 4B, which are described later.

A comparison of the lateral chromatic aberrations shown in FIG. 9A, FIG. 9B, FIG. 10A, and FIG. 10B to the lateral chromatic aberrations shown in FIG. 7A, FIG. 7B, FIG. 8A, and FIG. 8B reveals that lateral chromatic aberration can be corrected favorably even in an image pickup apparatus that is made compatible with the image pickup plane I', which has an image circle diameter different from the initial image circle diameter of the image pickup apparatus, by the focal length changing optical system A of the present invention.

The description given below is about the lateral chromatic aberration correction data $A_{1B}(r)$ and $A_{1R}(r)$ stored in advance in the data memory circuit 118 inside the image pickup optical system.

Each of the data $A_{1B}(r)$ and the data $A_{1R}(r)$ is a table in which coefficients of a function that represents a lateral chromatic aberration amount and that has, as a variable, the ratio r to the maximum image height are compiled for conditions regarding the zoom position, focus position, and f-number of the image pickup optical system L.

The data $A_{1B}(r)$ and data $A_{1R}(r)$ of the image pickup optical system L of FIG. 5 are shown in Table 1A and Table 1B, respectively. In this Embodiment, lateral chromatic aberration correction data Δ is expressed by Expression (14).

$$\Delta = a \times r^3 + b \times r^2 + c \times r \quad (14)$$

The symbol r represents a numerical value from 0 through 1, and takes a value 0 when an image is at the center of the image pickup element and a value 1 when the image height is 5.5 mm, which is the maximum image height.

tion ratios at the respective wavelengths, based on the spectral characteristics of the color separation prism and the sensitivity of the image pickup element to wavelengths. Table 1A and Table 1B are made up of pieces of data obtained under conditions in which the zoom position is at one of the wide angle end and the telephoto end, the focus position is one of infinity and 820 mm, and the stop is set to full-open aperture. In order to accomplish lateral chromatic aberration correction that is favorable throughout the entire zoom range, the entire focus range, and the entire aperture range, it is preferred to set the number of divisions in linear approximation between one piece of data and another piece of data that is performed to obtain lateral chromatic aberration correction data to a number suitable for a precise correction of actual lateral chromatic aberrations. While lateral chromatic aberration correction data is expressed by a third-order expression of r in Expression (14), an order suitable for a precise correction of actual lateral chromatic aberrations is preferred for an expression that expresses lateral chromatic aberration correction data, if the speed of computation permits.

As shown in FIG. 7A, FIG. 7B, FIG. 8A, and FIG. 8B, the pieces of lateral chromatic aberration correction data calculated with the use of the coefficients of Table 1A and Table 1B and Expression (14) and represented by the dot-dash line and the dot-dot-dash line substantially match the measured values represented by the filled circles and the open circles. It can therefore be said that a precise correction of lateral chromatic aberrations can be made with Table 1A and Table 1B.

The predetermined constant K, which is set in advance to the control unit (computing unit) 123 or 223, and coefficients

TABLE 1A $A_{1B}(r)$ Stop: Full-open aperture

| | Focus position: Infinity | | | Focus position: 820 mm | | |
|---|---|---|---|---|---|---|
| | a | b | c | a | b | c |
| Wide angle end | $-6.75 \times 10^1$ | $6.46 \times 10^1$ | $1.15 \times 10^1$ | $-1.04 \times 10^2$ | $9.83 \times 10^1$ | $1.38 \times 10^1$ |
| Telephoto end | $-8.30 \times 10^0$ | $-3.14 \times 10^1$ | $6.06 \times 10^0$ | $-1.68 \times 10^1$ | $2.74 \times 10^1$ | $-4.15 \times 10^0$ |

TABLE 1B $A_{1R}(r)$ Stop: Full-open aperture

| | Focus position: Infinity | | | Focus position: 820 mm | | |
|---|---|---|---|---|---|---|
| | a | b | c | a | b | c |
| Wide angle end | $3.56 \times 10^1$ | $-3.33 \times 10^1$ | $1.94 \times 10^1$ | $5.16 \times 10^1$ | $-4.91 \times 10^1$ | $1.70 \times 10^1$ |
| Telephoto end | $1.45 \times 10^1$ | $-2.73 \times 10^1$ | $4.26 \times 10^0$ | $-9.56 \times 10^0$ | $-2.59 \times 10^1$ | $3.75 \times 10^0$ |

In this Embodiment, the shift amount of a blue channel relative to a green channel is regarded as the amount of deviation of the line g from the line e, and the shift amount of a red channel relative to the green channel is regarded as the amount of deviation of the line C from the line e for the sake of simplification. It is preferred to calculate the lateral chromatic aberration amount for the channel of each color by taking into account the wavelength range and contribuof the functions $C_{1B}(r)$ and $C_{1R}(r)$, which have as a variable the ratio r to the maximum image height, are shown in Table 2. Lateral chromatic aberration amounts calculated by Expression (14) with the use of the coefficients of the functions $C_{1B}(r)$ and $C_{1R}(r)$ indicate the amount of lateral chromatic aberration unique to the focal length changing optical system A.

TABLE 2

Predetermined constant K and
Coefficients of functions $C_{1B}(r)$ and $C_{1R}(r)$

| K |
|---|
| 1.6 |

| $C_B(r)$ | | | $C_R(r)$ | | |
|---|---|---|---|---|---|
| a | b | c | a | b | c |
| $-7.26 \times 10^0$ | $-1.66 \times 10^0$ | $1.07 \times 10^1$ | $8.04 \times 10^1$ | $-1.33 \times 10^0$ | $-7.64 \times 10^0$ |

Further, each value of Expression (9) is shown in Table 3.

TABLE 3

Values of Expression (9)

| f1 | 7.8 |
|---|---|
| f2 | 11.3 |
| Expression (9) | 1.1 |

This Embodiment is close to the upper limit of Expression (9).

The pieces of lateral chromatic aberration correction data $B_{1B}(r)$ and $B_{1R}(r)$ calculated by Expressions (1) and (2) are shown in Table 4A and Table 4B, respectively. The control circuit 127 in the image pickup apparatus 128 and the control unit 223 in the image pickup apparatus 228 execute processing for canceling out lateral chromatic aberrations that are expressed by $B_{1B}(r)$ and $B_{1R}(r)$.

TABLE 4A $B_{1B}(r)$ Stop: Full-open aperture

| | Focus position: Infinity | | | Focus position: 820 mm | | |
|---|---|---|---|---|---|---|
| | a | b | c | a | b | c |
| Wide angle end | $-1.15 \times 10^2$ | $1.02 \times 10^2$ | $2.90 \times 10^1$ | $-1.74 \times 10^2$ | $1.56 \times 10^2$ | $3.28 \times 10^1$ |
| Telephoto end | $-2.05 \times 10^1$ | $-5.19 \times 10^1$ | $2.04 \times 10^1$ | $-3.42 \times 10^1$ | $4.22 \times 10^1$ | $4.01 \times 10^0$ |

TABLE 4B $B_{1R}(r)$ Stop: Full-open aperture

| | Focus position: Infinity | | | Focus position: 820 mm | | |
|---|---|---|---|---|---|---|
| | a | b | c | a | b | c |
| Wide angle end | $6.51 \times 10^1$ | $-5.46 \times 10^1$ | $2.34 \times 10^1$ | $9.07 \times 10^1$ | $-8.00 \times 10^1$ | $1.96 \times 10^1$ |
| Telephoto end | $3.12 \times 10^1$ | $-4.49 \times 10^1$ | $-8.15 \times 10^{-1}$ | $-7.26 \times 10^0$ | $-4.27 \times 10^1$ | $-1.63 \times 10^0$ |

In FIG. 9A, FIG. 9B, FIG. 10A, and FIG. 10B, the plotted points and the dash line substantially coincide with each other. It can therefore be said that the present invention has succeeded in providing lateral chromatic aberration correction data that is high in precision. According to Embodiment 1 and Embodiment 2, a precise lateral chromatic aberration correction can be made as shown in FIG. 9A, FIG. 9B, FIG. 10A, and FIG. 10B.

Numerical Embodiments 1-1 and 1-2 are described below. Numerical Embodiment 1-1 is optical data of the image pickup system of Embodiment 1 or Embodiment 2 that is illustrated in FIG. 5. Numerical Embodiment 1-2 is optical data of the image pickup system of Embodiment 1 or Embodiment 2 that is illustrated in FIG. 6. In numerical value data of Numerical Embodiments, A3 to A12 are aspheric coefficients. When a displacement in an optical axis direction at a point where the height from the optical axis is H is given as x with the surface vertex as a reference, the aspheric coefficients are expressed by Mathematical Expression 1.

$$X = \frac{(1/R)H^2}{1 + \sqrt{1-(1+K)(H/R)^2}} + A3 \cdot H^3 + A4 \cdot H^4 + A5 \cdot H^5 +$$ [Mathematical Expression 1]

-continued $$A6 \cdot H^6 + A7 \cdot H^7 + A8 \cdot H^8 + A9 \cdot H^9 +$$

$$A10 \cdot H^{10} + A11 \cdot H^{11} + A12 \cdot H^{12}$$

In Mathematical Expression 1, R represents a paraxial curvature radius and K represents a conic constant.

Numerical Embodiment 1-1

Unit mm

Surface Data

| Surface number | r | d | nd | vd | Effective diameter |
|---|---|---|---|---|---|
| 1 | −213.433 | 1.80 | 1.72916 | 54.7 | 82.90 |
| 2 | 213.433 | 5.58 | | | 80.63 |
| 3 | 556.690 | 1.80 | 1.80518 | 25.4 | 80.22 |
| 4 | 101.319 | 14.94 | 1.43875 | 94.9 | 79.10 |
| 5 | −162.669 | 0.15 | | | 79.19 |
| 6 | 175.439 | 8.28 | 1.61800 | 63.3 | 78.80 |
| 7 | −345.082 | 6.77 | | | 78.53 |
| 8 | 106.566 | 10.62 | 1.49700 | 81.5 | 74.34 |
| 9 | −301.725 | 0.15 | | | 73.45 |
| 10 | 66.906 | 6.52 | 1.72916 | 54.7 | 65.82 |
| 11 | 159.414 | (Variable) | | | 64.95 |
| 12* | 135.799 | 0.70 | 1.88300 | 40.8 | 27.49 |
| 13 | 14.159 | 6.06 | | | 21.73 |
| 14 | −131.437 | 6.68 | 1.80809 | 22.8 | 21.52 |
| 15 | −13.727 | 0.70 | 1.81600 | 46.6 | 21.23 |
| 16 | 48.936 | 0.16 | | | 20.32 |
| 17 | 23.757 | 5.95 | 1.53172 | 48.8 | 20.46 |
| 18 | −28.902 | 0.26 | | | 19.98 |
| 19 | −26.005 | 0.70 | 1.83481 | 42.7 | 19.92 |
| 20 | −258.788 | (Variable) | | | 19.82 |
| 21 | −28.262 | 0.70 | 1.74320 | 49.3 | 21.41 |
| 22 | 46.007 | 2.80 | 1.84666 | 23.8 | 23.55 |
| 23 | −1,313.700 | (Variable) | | | 24.07 |
| 24 (Stop) | ∞ | 1.30 | | | 28.08 |
| 25 | 1,095.091 | 4.36 | 1.65844 | 50.9 | 29.22 |
| 26 | −35.085 | 0.15 | | | 29.66 |
| 27 | 80.854 | 2.44 | 1.51633 | 64.1 | 30.44 |
| 28 | — | 0.15 | | | 30.41 |
| | 26,300.000 | | | | |
| 29 | 92.852 | 6.77 | 1.51633 | 64.1 | 30.35 |
| 30 | −32.467 | 1.80 | 1.83400 | 37.2 | 30.09 |
| 31 | −204.659 | 35.20 | | | 30.43 |
| 32 | 61.362 | 6.26 | 1.51633 | 64.1 | 30.43 |
| 33 | −52.603 | 1.73 | | | 30.06 |
| 34 | −98.726 | 1.80 | 1.83481 | 42.7 | 28.25 |
| 35 | 32.111 | 5.75 | 1.51742 | 52.4 | 27.41 |
| 36 | −91.243 | 4.40 | | | 27.60 |
| 37 | 62.274 | 6.77 | 1.48749 | 70.2 | 27.73 |
| 38 | −29.818 | 1.80 | 1.83400 | 37.2 | 27.47 |
| 39 | −355.420 | 0.15 | | | 27.90 |
| 40 | 53.543 | 4.40 | 1.51823 | 58.9 | 28.13 |
| 41 | −73.907 | 5.00 | | | 27.98 |
| 42 | ∞ | 33.00 | 1.60859 | 46.4 | 40.00 |
| 43 | ∞ | 13.20 | 1.51680 | 64.2 | 40.00 |
| 44 | ∞ | (Variable) | | | 40.00 |
| Image plane | ∞ | | | | |

Aspherical surface data
Twelfth surface

K = 8.58860e+000  A4 = 8.72570e−006  A6 = −1.90211e−008
A8 = 9.49066e−011  A10 = −9.79700e−013  A12 = 7.34817e−015
A3 = −9.99333e−007  A5 = −5.91697e−008  A7 = −4.82122e−010
A9 = 2.01841e−011  A11 = −1.38838e−013

Various data

| Zoom ratio | 21.00 | |
|---|---|---|
| Focal length | 7.80 | 163.80 |
| F-number | 1.80 | 2.69 |
| Angle of view | 35.19 | 1.92 |
| Image height | 5.50 | 5.50 |
| Total lens length | 286.17 | 286.17 |
| BF | 7.17 | 7.17 |
| d11 | 0.67 | 53.43 |
| d20 | 55.71 | 6.07 |
| d23 | 4.85 | 1.73 |
| d44 | 7.17 | 7.17 |
| Entrance pupil position | 50.20 | 608.47 |
| Exit pupil position | 318.13 | 318.13 |
| Front principal point position | 58.19 | 858.55 |
| Rear principal point position | −0.63 | −156.63 |

Zoom lens unit data

| Unit | First surface | Focal length | Lens structure length | Front principal point position | Rear principal point position |
|---|---|---|---|---|---|
| 1 | 1 | 68.20 | 56.61 | 36.62 | 2.85 |
| 2 | 12 | −13.40 | 21.23 | 2.17 | −11.59 |
| 3 | 21 | −42.80 | 3.50 | −0.09 | −2.01 |
| 4 | 24 | 62.21 | 136.44 | 71.95 | −141.16 |

Single lens data

| Lens | First surface | Focal length |
|---|---|---|
| 1 | 1 | −145.46 |
| 2 | 3 | −152.69 |
| 3 | 4 | 144.44 |
| 4 | 6 | 188.64 |
| 5 | 8 | 159.37 |
| 6 | 10 | 152.88 |
| 7 | 12 | −17.85 |
| 8 | 14 | 18.31 |
| 9 | 15 | −13.00 |
| 10 | 17 | 25.40 |
| 11 | 19 | −34.49 |
| 12 | 21 | −23.35 |
| 13 | 22 | 52.04 |
| 14 | 25 | 51.47 |
| 15 | 27 | 155.54 |
| 16 | 29 | 47.29 |
| 17 | 30 | −46.20 |
| 18 | 32 | 55.70 |
| 19 | 34 | −28.68 |
| 20 | 35 | 46.44 |
| 21 | 37 | 42.24 |
| 22 | 38 | −38.88 |
| 23 | 40 | 60.39 |
| 24 | 42 | 0.00 |
| 25 | 43 | 0.00 |

Numerical Embodiment 1-2

Unit mm

Surface Data

| Surface number | r | d | nd | vd | Effective diameter |
|---|---|---|---|---|---|
| 1 | −213.433 | 1.80 | 1.72916 | 54.7 | 82.90 |
| 2 | 213.433 | 5.58 | | | 80.63 |
| 3 | 556.690 | 1.80 | 1.80518 | 25.4 | 80.22 |
| 4 | 101.319 | 14.94 | 1.43875 | 94.9 | 79.10 |
| 5 | −162.669 | 0.15 | | | 79.19 |
| 6 | 175.439 | 8.28 | 1.61800 | 63.3 | 78.80 |
| 7 | −345.082 | 6.77 | | | 78.53 |
| 8 | 106.566 | 10.62 | 1.49700 | 81.5 | 74.34 |
| 9 | −301.725 | 0.15 | | | 73.45 |
| 10 | 66.906 | 6.52 | 1.72916 | 54.7 | 65.82 |
| 11 | 159.414 | (Variable) | | | 64.95 |
| 12* | 135.799 | 0.70 | 1.88300 | 40.8 | 27.49 |
| 13 | 14.159 | 6.06 | | | 21.73 |
| 14 | −131.437 | 6.68 | 1.80809 | 22.8 | 21.52 |
| 15 | −13.727 | 0.70 | 1.81600 | 46.6 | 21.23 |
| 16 | 48.936 | 0.16 | | | 20.32 |
| 17 | 23.757 | 5.95 | 1.53172 | 48.8 | 20.46 |

-continued

Unit mm

| | | | | | |
|---|---|---|---|---|---|
| 18 | −28.902 | 0.26 | | | 19.98 |
| 19 | −26.005 | 0.70 | 1.83481 | 42.7 | 19.92 |
| 20 | −258.788 | (Variable) | | | 19.82 |
| 21 | −28.262 | 0.70 | 1.74320 | 49.3 | 21.41 |
| 22 | 46.007 | 2.80 | 1.84666 | 23.8 | 23.55 |
| 23 | −1,313.700 | (Variable) | | | 24.07 |
| 24 (Stop) | ∞ | 1.30 | | | 28.08 |
| 25 | 1,095.091 | 4.36 | 1.65844 | 50.9 | 29.22 |
| 26 | −35.085 | 0.15 | | | 29.66 |
| 27 | 80.854 | 2.44 | 1.51633 | 64.1 | 30.44 |
| 28 | — | 0.15 | | | 30.41 |
| | | 26,300.000 | | | |
| 29 | 92.852 | 6.77 | 1.51633 | 64.1 | 30.35 |
| 30 | −32.467 | 1.80 | 1.83400 | 37.2 | 30.09 |
| 31 | −204.659 | 35.20 | | | 30.43 |
| 32 | 61.362 | 6.26 | 1.51633 | 64.1 | 30.43 |
| 33 | −52.603 | 1.73 | | | 30.06 |
| 34 | −98.726 | 1.80 | 1.83481 | 42.7 | 28.25 |
| 35 | 32.111 | 5.75 | 1.51742 | 52.4 | 27.41 |
| 36 | −91.243 | 4.40 | | | 27.60 |
| 37 | 62.274 | 6.77 | 1.48749 | 70.2 | 27.73 |
| 38 | −29.818 | 1.80 | 1.83400 | 37.2 | 27.47 |
| 39 | −355.420 | 0.15 | | | 27.90 |
| 40 | 53.543 | 4.40 | 1.51823 | 58.9 | 28.13 |
| 41 | −73.907 | 5.00 | | | 27.98 |
| 42 | 74.478 | 1.70 | 1.59240 | 68.3 | 25.06 |
| 43 | 22.163 | 6.75 | | | 23.54 |
| 44 | −54.371 | 1.50 | 1.76385 | 48.5 | 23.78 |
| 45 | 24.534 | 5.85 | 1.85026 | 32.3 | 25.45 |
| 46 | −473.023 | 0.15 | | | 25.84 |
| 47 | 34.820 | 7.36 | 1.48749 | 70.2 | 26.73 |
| 48 | −34.541 | 1.50 | 2.04976 | 27.1 | 26.57 |
| 49 | −63.119 | 0.15 | | | 27.03 |
| 50 | 118.792 | 3.45 | 1.48749 | 70.2 | 26.76 |
| 51 | −458.900 | 4.83 | | | 26.38 |
| 52 | ∞ | 33.00 | 1.60859 | 46.4 | 40.00 |
| 53 | ∞ | 13.20 | 1.51680 | 64.2 | 40.00 |
| 54 | ∞ | (Variable) | | | 40.00 |
| Image plane | ∞ | | | | |

Aspherical surface data
Twelfth surface

K = 8.58860e+000   A4 = 8.72570e−006   A6 = −1.90211e−008
A8 = 9.49066e−011   A10 = −9.79700e−013   A12 = 7.34817e−015
A3 = −9.99333e−007   A5 = −5.91697e−008   A7 = −4.82122e−010
A9 = 2.01841e−011   A11 = −1.38838e−013

Various data

| Zoom ratio | 21.00 | |
| --- | --- | --- |
| Focal length | 11.31 | 237.51 |
| F-number | 2.61 | 3.90 |
| Angle of view | 35.21 | 1.92 |
| Image height | 7.98 | 7.98 |
| Total lens length | 319.41 | 319.41 |
| BF | 7.17 | 7.17 |
| d11 | 0.67 | 53.43 |
| d20 | 55.71 | 6.07 |
| d23 | 4.85 | 1.73 |
| d54 | 7.17 | 7.17 |
| Entrance pupil position | 50.20 | 608.47 |
| Exit pupil position | −2,242.78 | −2,242.78 |
| Front principal point position | 61.45 | 820.90 |
| Rear principal point position | −4.14 | −230.34 |

Zoom lens unit data

| Unit | First surface | Focal length | Lens structure length | Front principal point position | Rear principal point position |
| --- | --- | --- | --- | --- | --- |
| 1 | 1 | 68.20 | 56.61 | 36.62 | 2.85 |
| 2 | 12 | −13.40 | 21.23 | 2.17 | −11.59 |
| 3 | 21 | −42.80 | 3.50 | −0.09 | −2.01 |
| 4 | 24 | 66.45 | 169.67 | 64.37 | −192.67 |

Single lens data

| Lens | First surface | Focal length |
| --- | --- | --- |
| 1 | 1 | −145.46 |
| 2 | 3 | −152.69 |
| 3 | 4 | 144.44 |
| 4 | 6 | 188.64 |
| 5 | 8 | 159.37 |
| 6 | 10 | 152.88 |
| 7 | 12 | −17.85 |
| 8 | 14 | 18.31 |
| 9 | 15 | −13.00 |
| 10 | 17 | 25.40 |
| 11 | 19 | −34.49 |
| 12 | 21 | −23.35 |
| 13 | 22 | 52.04 |
| 14 | 25 | 51.47 |
| 15 | 27 | 155.54 |
| 16 | 29 | 47.29 |
| 17 | 30 | −46.20 |
| 18 | 32 | 55.70 |
| 19 | 34 | −28.68 |
| 20 | 35 | 46.44 |
| 21 | 37 | 42.24 |
| 22 | 38 | −38.88 |
| 23 | 40 | 60.39 |
| 24 | 42 | −53.73 |
| 25 | 44 | −21.84 |
| 26 | 45 | 27.38 |
| 27 | 47 | 36.73 |
| 28 | 48 | −74.04 |
| 29 | 50 | 193.30 |
| 30 | 52 | 0.00 |
| 31 | 53 | 0.00 |

Embodiment 3

Figure 11:
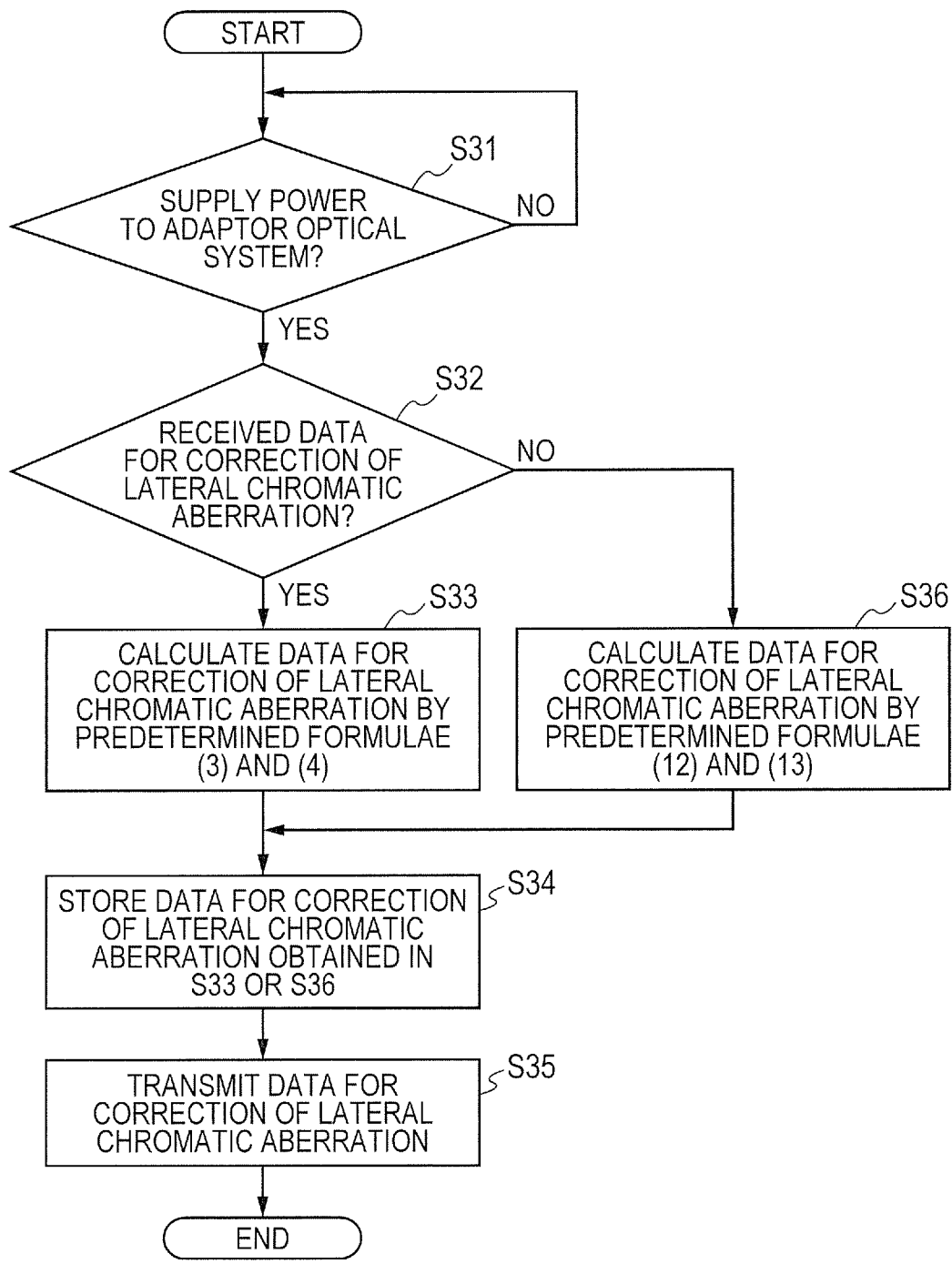
FIG. 11 is a flow chart in Embodiment 3 of the present invention.

Embodiment 3 of the present invention is described. An image pickup system of Embodiment 3 has the same configuration as the one in Embodiment 1 which is illustrated in FIG. 1. A flow chart of lateral chromatic aberration correction in the attachment optical system 125 of Embodiment 3 is illustrated in FIG. 11.

First, in Step (abbreviated as "S" in the drawing) 31, the attachment optical system 125 proceeds to Step 32 in the case where the control unit 123 determines that power has been supplied from the image pickup apparatus 128. In Step 32, whether or not lateral chromatic aberration correction data has been received from the control apparatus 117 is determined, and the attachment optical system 125 proceeds to Step 33 in the case where the data has been received. In Step 33, lateral chromatic aberration correction data is calculated by Expressions (3) and (4), and the attachment optical system 125 then proceeds to Step 34. In Step 34, the lateral chromatic aberration correction data calculated in Step 33 is stored in the memory 124, and the attachment optical system 125 proceeds to Step 35. In Step 35, the lateral chromatic aberration correction data stored in Step 34 is transmitted to the image pickup apparatus 128.

When it is determined in Step 32 that lateral chromatic aberration correction data has not been received, the attachment optical system 125 proceeds to Step 36. In Step 36, lateral chromatic aberration correction data is calculated by Expressions (12) and (13), and the attachment optical system 125 proceeds to Step 34.

Embodiment 4

Figure 12:
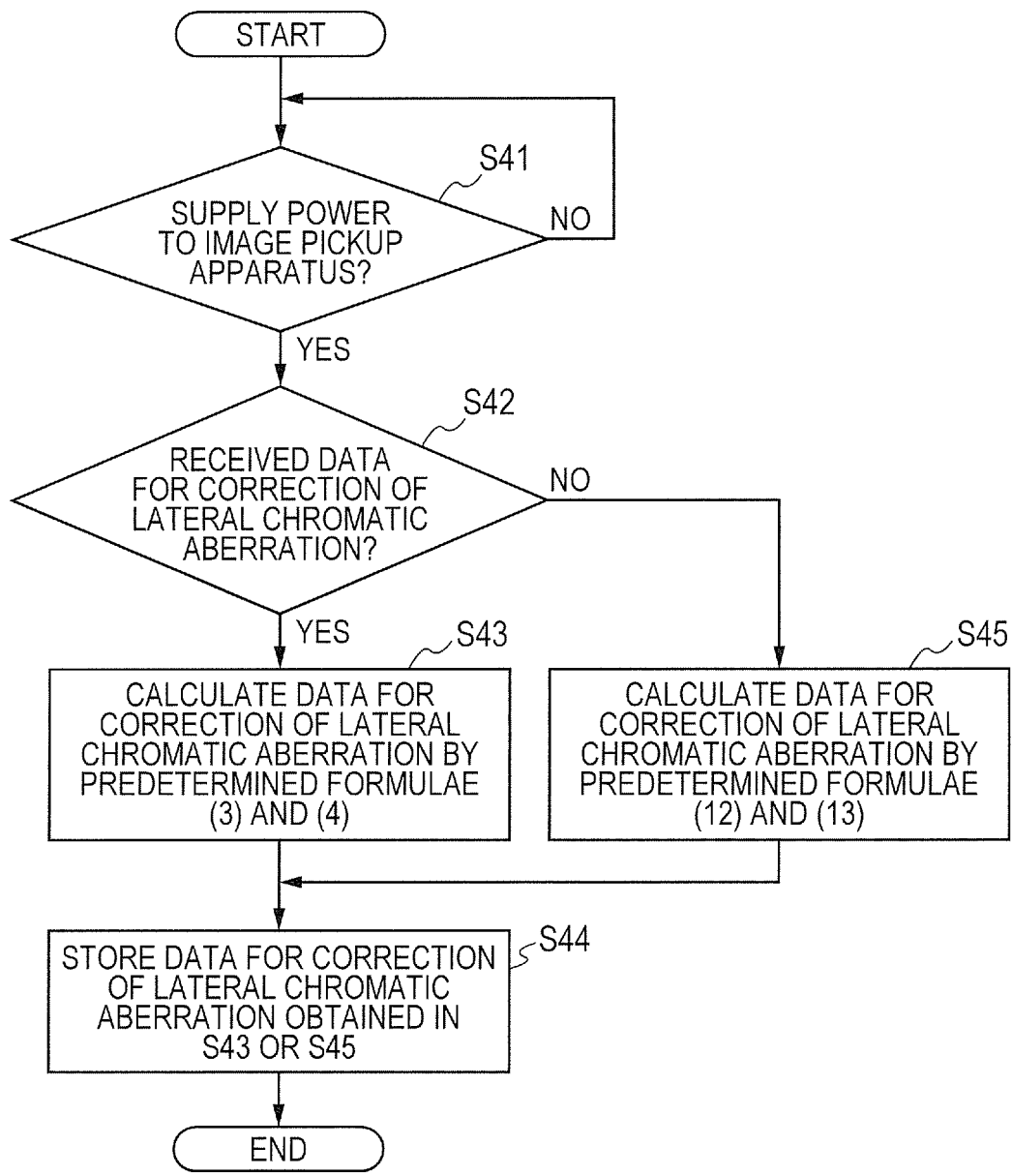
FIG. 12 is a flow chart in Embodiment 4 of the present invention.

Embodiment 4 of the present invention is described. An image pickup system of Embodiment 4 has the same configuration as the one in Embodiment 2 which is illustrated in FIG. 3. A flow chart of lateral chromatic aberration correction in the image pickup apparatus 228 of Embodiment 4 is illustrated in FIG. 12.

In Step 41, the image pickup apparatus 228 proceeds to Step 42 in the case where it is determined that power has been supplied to the image pickup apparatus 228. In Step 42, whether or not lateral chromatic aberration correction data has been received from the control apparatus 117 is determined, and the attachment optical system 125 proceeds to Step 43 in the case where the data has been received. In Step 43, lateral chromatic aberration correction data is calculated by Expressions (3) and (4), and the attachment optical system 125 then proceeds to Step 44. In Step 44, the lateral chromatic aberration correction data calculated in Step 43 is stored in the memory 224.

When it is determined in Step 42 that lateral chromatic aberration correction data has not been received, the attachment optical system 125 proceeds to Step 45. In Step 45, lateral chromatic aberration correction data is calculated by Expressions (12) and (13), and the attachment optical system 125 proceeds to Step 44.

Numerical Embodiments are described next. The configuration of the optical system according to Embodiment 3 or Embodiment 4 is the same as that of the image pickup optical system according to Embodiment 1 or Embodiment 2 which is illustrated in FIG. 6, where the focal length changing optical system A is mounted, and in FIG. 5.

Figure 13A:
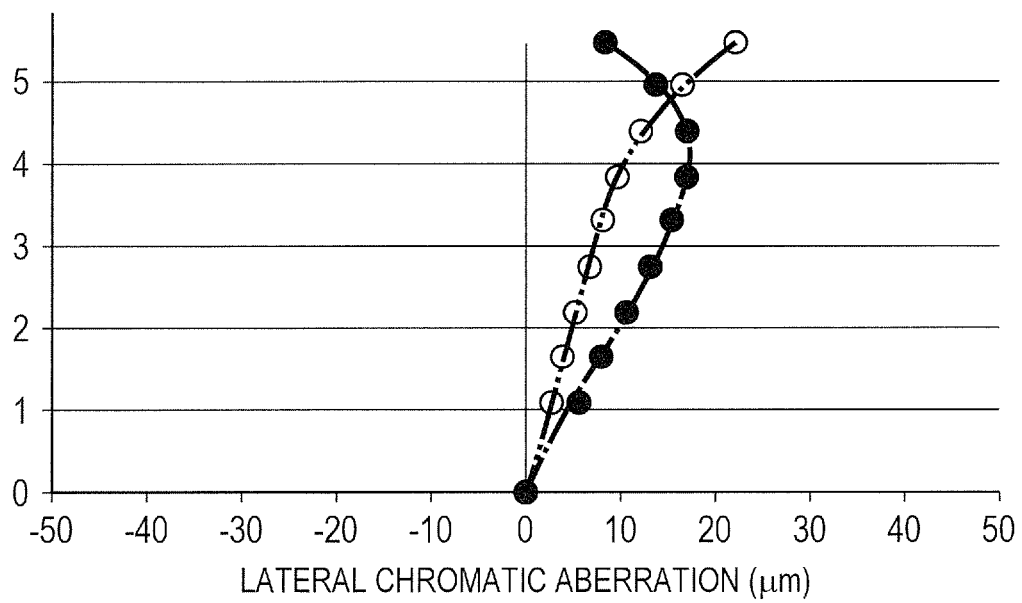
FIG. 13A is a graph for showing measured values and calculated values of lateral chromatic aberration of the image pickup optical system according to Numerical Embodiment 1-1 of the present invention at the wide angle end when focused to infinity in Embodiment 3 and Embodiment 4.
Figure 13B:
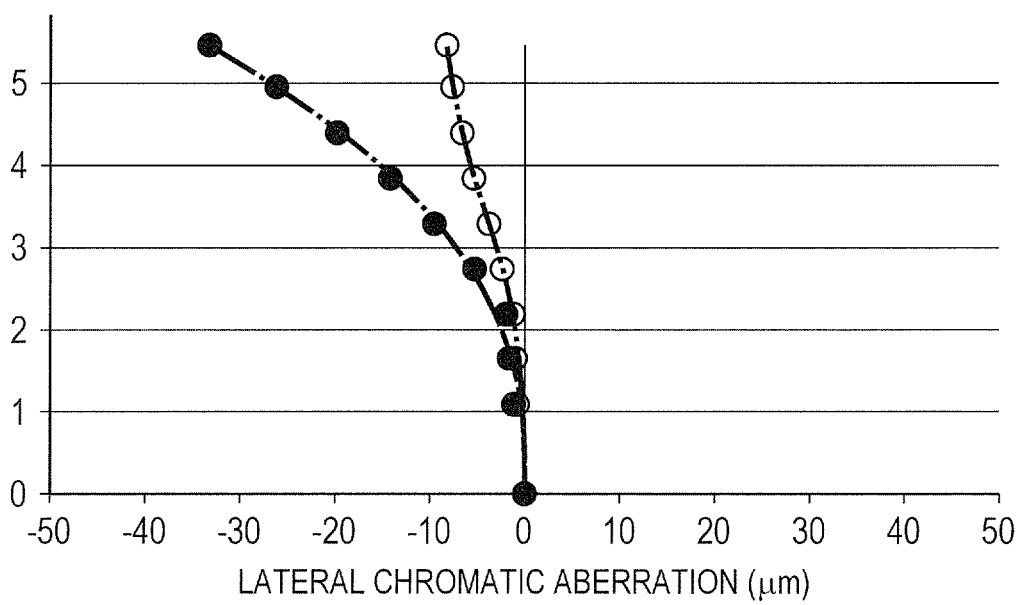
FIG. 13B is a graph for showing measured values and calculated values of lateral chromatic aberration of the image pickup optical system according to Numerical Embodiment 1-1 of the present invention at the telephoto end when focused to infinity in Embodiment 3 and Embodiment 4.

FIG. 13A and FIG. 13B are graphs for showing measured values and calculated values of lateral chromatic aberration in the image pickup optical system according to Numerical Embodiment 1-1 of Embodiment 3 or Embodiment 4 at the wide angle end (FIG. 13A) and the telephoto end (FIG. 13B), respectively, when the image pickup optical system is focused at an object distance of infinity. Pieces of lateral chromatic aberration correction data (the dot-dash line and the dot-dot-dash line) are calculated based on Table 5A and Table 5B and Expression (15), which are described later.

Figure 14A:
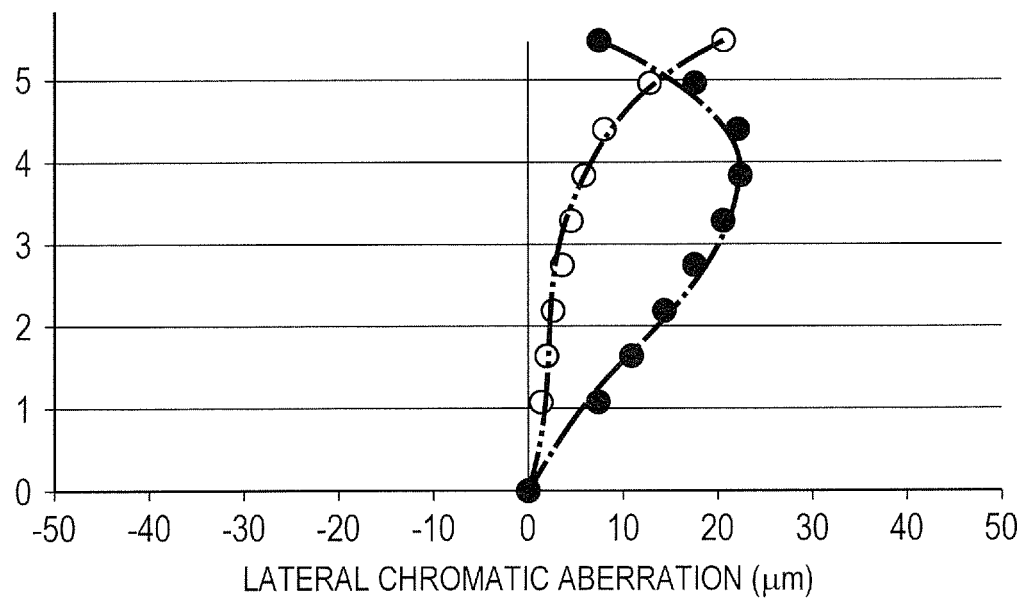
FIG. 14A is a graph for showing measured values and calculated values of lateral chromatic aberration of the image pickup optical system according to Numerical Embodiment 1-1 of the present invention at the wide angle end when focused at an object distance of 0.82 m in Embodiment 3 and Embodiment 4.
Figure 14B:
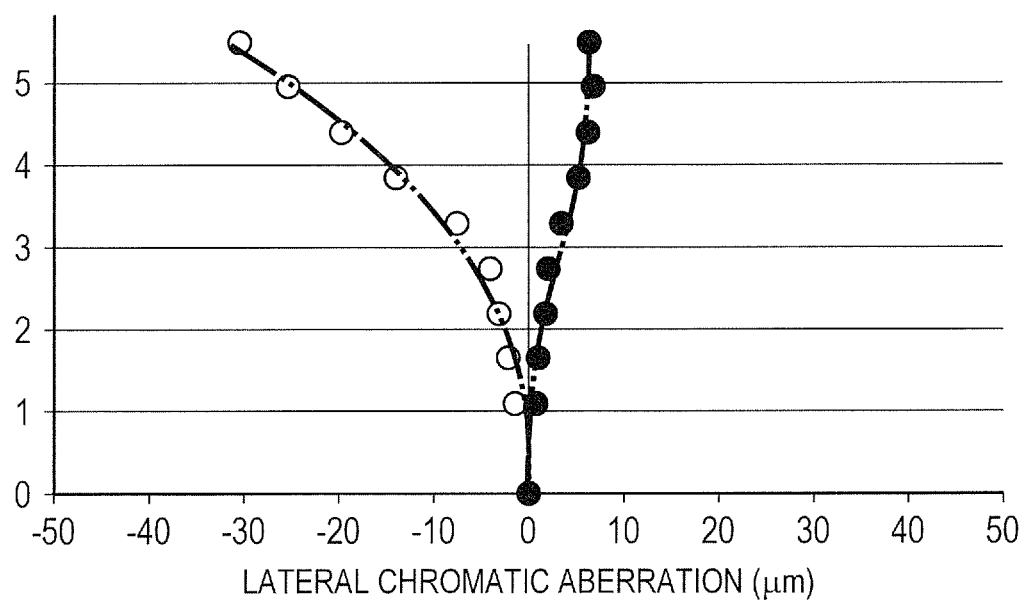
FIG. 14B is a graph for showing measured values and calculated values of lateral chromatic aberration of the image pickup optical system according to Numerical Embodiment 1-1 of the present invention at the telephoto end when focused at an object distance of 0.82 m in Embodiment 3 and Embodiment 4.

FIG. 14A and FIG. 14B are graphs for showing measured values and calculated values of lateral chromatic aberration in the image pickup optical system according to Numerical Embodiment 1-1 of Embodiment 3 or Embodiment 4 at the wide angle end (FIG. 14A) and the telephoto end (FIG. 14B), respectively, when the image pickup optical system is focused at an object distance of 0.82 m. The object distance is expressed as a distance from the vertex of a lens surface that is closest to the object side among lenses in the first lens unit. Pieces of lateral chromatic aberration correction data (the dot-dash line and the dot-dot-dash line) are calculated based on Table 5A and Table 5B and Expression (15), which are described later.

Figure 15A:
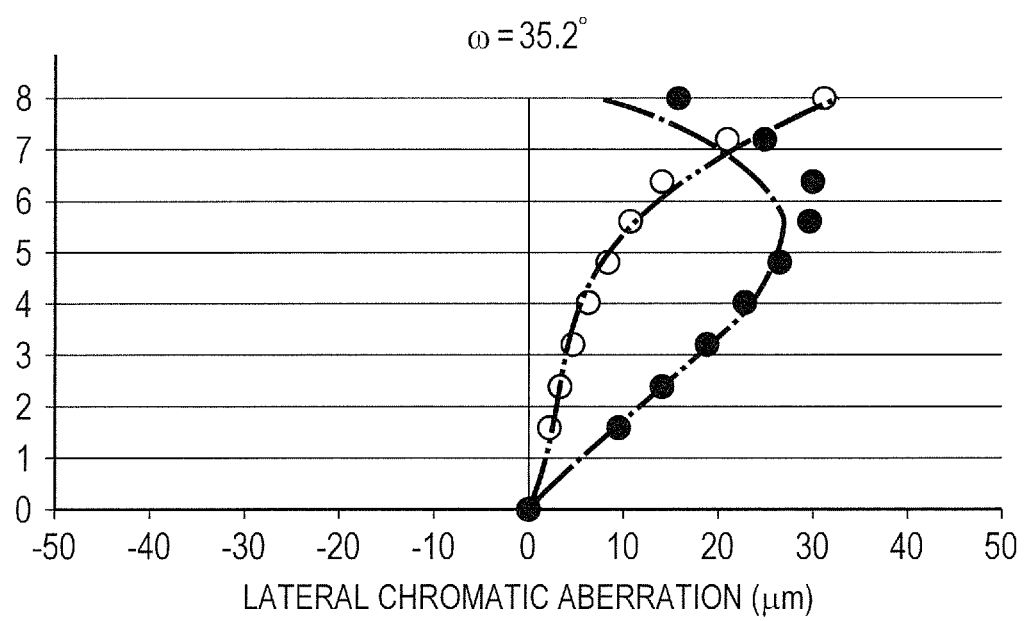
FIG. 15A is a graph for showing measured values and calculated values of lateral chromatic aberration in Numerical Embodiment 1-2 of the present invention at the wide angle end when the optical system is focused to infinity in Embodiment 3 and Embodiment 4.
Figure 15B:
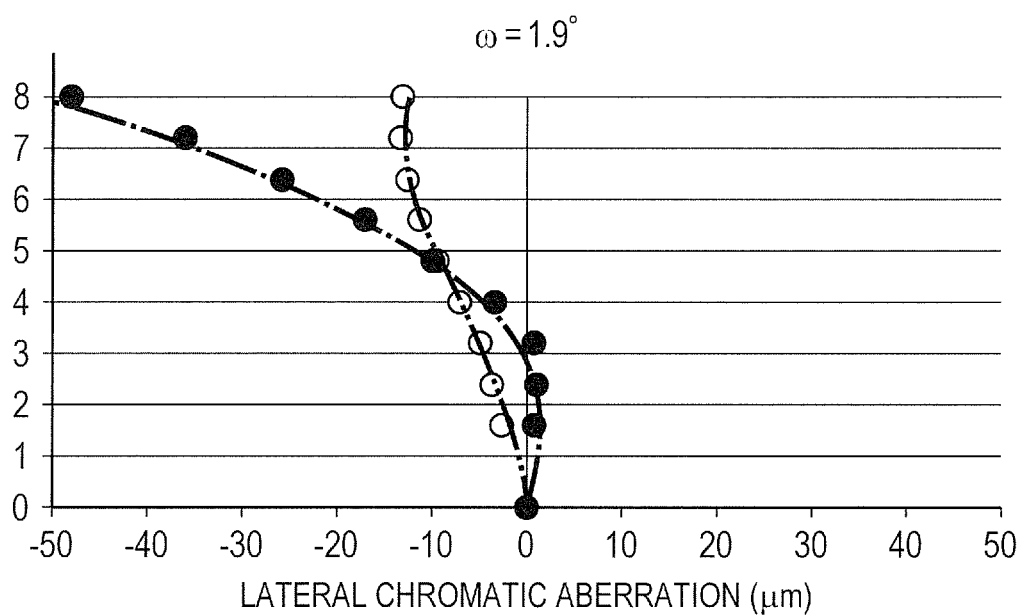
FIG. 15B is a graph for showing measured values and calculated values of lateral chromatic aberration in Numerical Embodiment 1-2 of the present invention at the telephoto end when the optical system is focused to infinity in Embodiment 3 and Embodiment 4.

FIG. 15A and FIG. 15B are graphs for showing measured values and calculated values of lateral chromatic aberration in the optical system according to Numerical Embodiment 1-1 of Embodiment 3 or Embodiment 4 at the wide angle end (FIG. 15A) and the telephoto end (FIG. 15B), respectively, when the image pickup optical system is focused at an object distance of infinity. Pieces of lateral chromatic aberration correction data (the dot-dash line and the dot-dot-dash line) are calculated based on Table 8A and Table 8B and Expression (16).

Figure 16A:
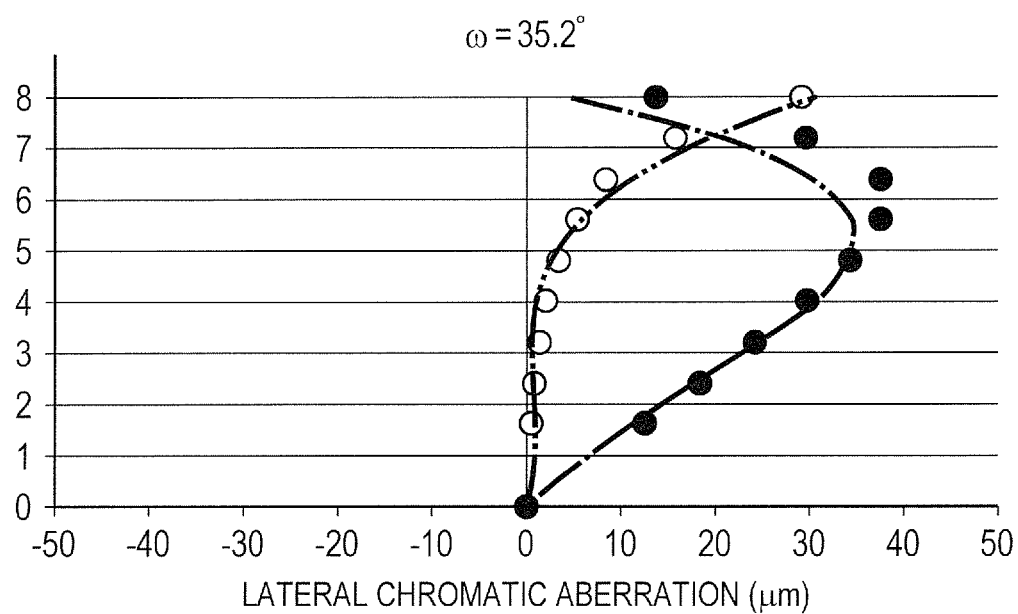
FIG. 16A is a graph for showing measured values and calculated values of lateral chromatic aberration in Numerical Embodiment 1-2 of the present invention at the wide angle end when the optical system is focused at an object distance of 0.82 m in Embodiment 3 and Embodiment 4.
Figure 16B:
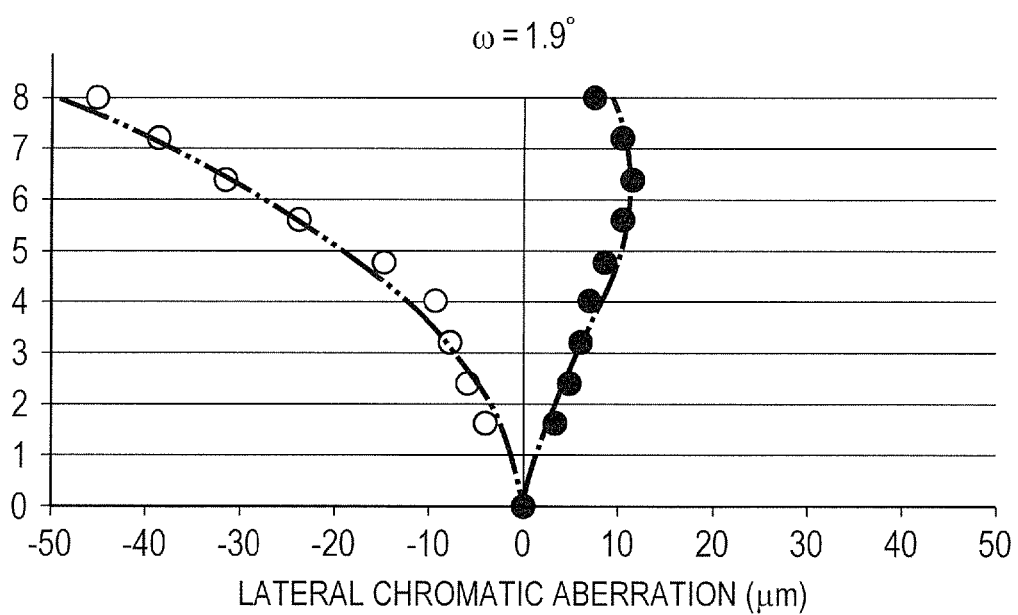
FIG. 16B is a graph for showing measured values and calculated values of lateral chromatic aberration in Numerical Embodiment 1-2 of the present invention at the telephoto end when the optical system is focused at an object distance of 0.82 m in Embodiment 3 and Embodiment 4.

FIG. 16A and FIG. 16B are graphs for showing measured values and calculated values of lateral chromatic aberration in the optical system according to Embodiment 3 or Embodiment 4 to which the focal length changing optical system has not been applied yet, at the wide angle end (FIG. 16A) and the telephoto end (FIG. 16B), respectively, when the optical system is focused at an object distance of 0.82 m. The object distance is expressed as a distance from the vertex of a lens surface that is closest to the object side among lenses in the first lens unit. Pieces of lateral chromatic aberration correction data (the dot-dash line and the dot-dot-dash line) are calculated based on Table 8A and Table 8B and Expression (16).

A comparison of the lateral chromatic aberrations shown in FIG. 15A, FIG. 15B, FIG. 16A, and FIG. 16B to the lateral chromatic aberrations shown in FIG. 13A, FIG. 13B, FIG. 14A, and FIG. 14B as aberrations of the image pickup system to which the focal length changing optical system A has not been applied yet proves that the present invention has succeeded in providing lateral chromatic aberration correction data that is high in precision. According to Embodiment 3 and Embodiment 4, correction data that enables an image pickup system to correct lateral chromatic aberrations with precision as shown in FIG. 15A, FIG. 15B, FIG. 16A, and FIG. 16B.

The description given below is about the lateral chromatic aberration correction data $A_{2B}(y)$ and $A_{2R}(y)$ stored in advance in the data memory circuit 118 inside the image pickup optical system. The data $A_{2B}(y)$ and the data $A_{2R}(y)$ are each a table in which coefficients of a function that represents a lateral chromatic aberration amount and that has, as a variable, the image height y photographable by the image pickup optical system are compiled for conditions regarding the zoom position, focus position, and f-number of the image pickup optical system.

The data $A_{2B}(y)$ and data $A_{2R}(y)$ of the image pickup optical system L of FIG. 5 are shown in Table 5A and Table 5B, respectively. In this Embodiment, lateral chromatic aberration correction data A is expressed by Expression (15).

$$\Delta = axy^3 + bxy^2 + cxy \quad (15)$$

TABLE 5A

| | $A_{2B}(y)$ Stop: Full-open aperture | | | | | |
|---|---|---|---|---|---|---|
| | Focus position: Infinity | | | Focus position: 820 mm | | |
| | a | b | c | a | b | c |
| Wide Angle End | $-4.06 \times 10^{-1}$ | $2.14 \times 10^{0}$ | $2.09 \times 10^{0}$ | $-6.25 \times 10^{-1}$ | $3.25 \times 10^{0}$ | $2.52 \times 10^{0}$ |
| Telephoto end | $-4.99 \times 10^{-2}$ | $-1.04 \times 10^{0}$ | $1.10 \times 10^{0}$ | $-1.01 \times 10^{-1}$ | $9.06 \times 10^{-1}$ | $-7.55 \times 10^{-1}$ |

TABLE 5B

A$_{2R}$(y) Stop: Full-open aperture

| | Focus position: Infinity | | | Focus position: 820 mm | | |
|---|---|---|---|---|---|---|
| | a | b | c | a | b | c |
| Wide Angle End | $2.14 \times 10^{-1}$ | $-1.10 \times 10^{0}$ | $3.53 \times 10^{0}$ | $3.10 \times 10^{-1}$ | $-1.62 \times 10^{0}$ | $3.10 \times 10^{0}$ |
| Telephoto end | $8.71 \times 10^{-2}$ | $-9.01 \times 10^{-1}$ | $7.75 \times 10^{-1}$ | $-5.75 \times 10^{-2}$ | $-8.55 \times 10^{-1}$ | $6.82 \times 10^{-1}$ |

As in the image pickup optical system of Numerical Embodiment 1-1 described with reference to FIG. 5, the image pickup plane I corresponds to a circle with an image circle diameter ($\phi$) of 11 mm and y is a numerical value from 0 through 5.5. The value y being 0 refers to the center of the image pickup element and the value y being 5.5 refers to positions of the image height being 5.5 mm, which is the maximum image height.

In this Embodiment, the shift amount of a blue channel relative to a green channel is regarded as the amount of deviation of the line g from the line e, and the shift amount of a red channel relative to the green channel is regarded as the amount of deviation of the line C from the line e for the sake of simplification. It is preferred to calculate the lateral chromatic aberration amount for the channel of each color by taking into account the wavelength range and contribution ratios at the respective wavelengths, based on the spectral characteristics of the color separation prism and the sensitivity of the image pickup element to wavelengths. Table 5A and Table 5B are made up of pieces of data obtained under conditions in which the zoom position is at one of the wide angle end and the telephoto end, the focus position is one of infinity and 820 mm, and the stop is set to full-open aperture. In order to accomplish lateral chromatic aberration correction that is favorable throughout the entire zoom range, the entire focus range, and the entire aperture range, it is preferred to set the number of divisions in linear approximation between one piece of data and another piece of data that is performed to obtain lateral chromatic aberration correction data to a number suitable for a precise correction of actual lateral chromatic aberrations. While lateral chromatic aberration correction data is expressed by a third-order expression of y in Expression (15), an order suitable for a precise correction of actual lateral chromatic aberrations is preferred for an expression that expresses lateral chromatic aberration correction data, if the speed of computation permits.

As shown in FIG. 13A, FIG. 13B, FIG. 14A, and FIG. 14B, the pieces of lateral chromatic aberration correction data calculated with the use of the coefficients of Table 5A and Table 5B and Expression (15) and represented by the dot-dash line and the dot-dot-dash line substantially match the measured values represented by the filled circles and the open circles. It can therefore be said that a precise correction of lateral chromatic aberrations can be made with Table 5A and Table 5B.

The predetermined constant K, which is set in advance to the control unit (computing unit) 123 or 223, and coefficients of the functions $C_{2B}(y')$ and $C_{2R}(y')$, which have the image height y' as a variable, are shown in Table 6. The image height y' is a height at which the image pickup optical system can pick up an image with the focal length changing optical system mounted thereon. Lateral chromatic aberration amounts calculated by Expression (15) with the use of the coefficients of the functions $C_{2B}(y')$ and $C_{2R}(y')$ indicate the amount of lateral chromatic aberration unique to the attachment optical system.

TABLE 6

Predetermined constant K and
Coefficients of Functions $C_{2B}(y')$ and $C_{2R}(y')$
K
1.39

| | $C_B(y')$ | | | $C_R(y')$ | | |
|---|---|---|---|---|---|---|
| | a | b | c | a | b | c |
| | $-2.16 \times 10^{-2}$ | $5.08 \times 10^{-3}$ | $1.37 \times 10^{0}$ | $1.93 \times 10^{-2}$ | $-4.82 \times 10^{-2}$ | $-9.21 \times 10^{-1}$ |

As in the optical system described with reference to FIG. 6, the image pickup plane I' corresponds to an image circle diameter ($\phi$) of 15.96 mm and y' is a numerical value from 0 through 7.98. The value y' being 0 refers to the center of the image pickup element and the value y' being 7.98 refers to positions of the image height being 7.98 mm, which is the maximum image height. Lateral chromatic aberration correction data A in this case is expressed by Expression (16).

$$\Delta = a \times y'^3 + b \times y'^2 + c \times y' \quad (16)$$

Further, each value of Expression (9) is shown in Table 7.

TABLE 7

| Values of Expression (9) | |
|---|---|
| f1 | 7.8 |
| f2 | 11.3 |
| Expression (9) | 0.96 |

This Embodiment is close to the lower limit of Expression (9).

The pieces of lateral chromatic aberration correction data $B_{2B}(y')$ and $B_{2R}(y')$ calculated by Expressions (3) and (4) are shown in Table 8A and Table 8B, respectively. The control circuit 127 in the image pickup apparatus 128 executes processing for canceling out lateral chromatic aberrations that are expressed by $B_{2B}(y')$ and $B_{2R}(y')$ and Expression (16).

TABLE 8A $B_{2B}(y')$ Stop: Full-open aperture

| | Focus position: Infinity | | | Focus position: 820 mm | | |
|---|---|---|---|---|---|---|
| | a | b | c | a | b | c |
| Wide Angle End | $-2.32 \times 10^{-1}$ | $1.54 \times 10^{0}$ | $3.45 \times 10^{0}$ | $-3.45 \times 10^{-1}$ | $2.34 \times 10^{0}$ | $3.88 \times 10^{0}$ |
| Telephoto end | $-4.75 \times 10^{-2}$ | $-7.42 \times 10^{-1}$ | $2.47 \times 10^{0}$ | $-7.40 \times 10^{-2}$ | $6.57 \times 10^{-1}$ | $6.10 \times 10^{-1}$ |

TABLE 8B $B_{2R}(y')$ Stop: Full-open aperture

| | Focus position: Infinity | | | Focus position: 820 mm | | |
|---|---|---|---|---|---|---|
| | a | b | c | a | b | c |
| Wide Angle End | $1.30 \times 10^{-1}$ | $-8.40 \times 10^{-1}$ | $2.60 \times 10^{0}$ | $1.80 \times 10^{-1}$ | $-1.22 \times 10^{0}$ | $2.18 \times 10^{0}$ |
| Telephoto end | $6.43 \times 10^{-2}$ | $-6.96 \times 10^{-1}$ | $-1.46 \times 10^{-1}$ | $-1.05 \times 10^{-2}$ | $-6.64 \times 10^{-1}$ | $-2.39 \times 10^{-1}$ |

By using the focal length changing optical system of one of Embodiments described above which is detachably mounted onto the image side of an image pickup optical system, an image pickup system favorable for the computation of optimum lateral chromatic aberration correction data is realized with a simple configuration.

The exemplary Embodiments of the present invention are described above, but needless to say, the present invention is not limited to those Embodiments, and various modifications and changes can be made thereto without departing from the spirit of the present invention. For example, in the case where the attachment optical system has not received the lateral chromatic aberration correction data $A_{2B}$ and $A_{2R}$ from the image pickup optical system, it is preferred to transmit the lateral chromatic aberration correction data $B_{2B}$ and $B_{2R}$ calculated by Expressions (10) and (11) or Expressions (12) and (13) to the image pickup apparatus. The reason is as described above.

In Embodiments given as examples, the reception of lateral chromatic aberration correction data from the image pickup optical system and the transmission of lateral chromatic aberration correction data to the image pickup apparatus are wired communication via the cable 131 and the cable 132, respectively. However, the present invention is not limited thereto. For example, a signal communication unit having a contact point in a mount portion may be used, or wireless communication may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-098794, filed May 14, 2015, which is hereby incorporated by reference herein in its entirety.

What is claimed is:

1. An attachment optical system to be detachably mounted between an image pickup optical system and an image pickup apparatus, comprising:

a receiver configured to receive first information for correcting lateral chromatic aberrations that are caused by the image pickup optical system;

a computing unit configured to derive, based on the first information and optical characteristics of the attachment optical system, second information for correcting lateral chromatic aberrations; and a transmitter configured to transmit the second information to the image pickup apparatus, wherein the first information and the second information comprise information for obtaining lateral chromatic aberration amounts under conditions regarding a zoom position, focus position, and f-number of the image pickup optical system, based on a ratio of an image height to be corrected on an image plane to a maximum image height, wherein the first information and the second information each indicate shift amounts of blue and red relative to green in a radial direction of a circle centered about an optical axis position, and wherein the shift amount of blue $B_{1B}(r)$ relative to green in the second information and the shift amount of red $B_{1R}(r)$ relative to green in the second information are derived as follows:

$$B_{1B}(r) = K \times A_{1B}(r) + C_{1B}(r)$$

$$B_{1R}(r) = K \times A_{1R}(r) + C_{1R}(r),$$

where K represents a predetermined constant that is set in advance to the computing unit, r represents the ratio of the image height to be corrected on the image plane to the maximum image height, $A_{1B}(r)$ represents the shift amount of blue relative to green in the first information, $A_{1R}(r)$ represents the shift amount of red relative to green in the first information, and $C_{1B}(r)$ and $C_{1R}(r)$ respectively represent functions that have r as a variable.

2. An attachment optical system to be detachably mounted between an image pickup optical system and an image pickup apparatus, comprising:

a receiver configured to receive first information for correcting lateral chromatic aberrations that are caused by the image pickup optical system;

a computing unit configured to derive, based on the first information and optical characteristics of the attachment optical system, second information for correcting lateral chromatic aberrations; and a transmitter configured to transmit the second information to the image pickup apparatus, wherein the first information comprises information for obtaining lateral chromatic aberration amounts under conditions regarding a zoom position, focus position, and f-number of the image pickup optical system, based on an image height on an image plane of the image pickup optical system, wherein the second information comprises lateral chromatic aberration amounts that are expressed based on an image height on an image plane of the image pickup optical system with the attachment optical system mounted onto the image pickup optical system, wherein the first information and the second information each indicate shift amounts of blue and red relative to green in a radial direction of a circle centered about an optical axis position, and wherein the shift amount of blue $B_{2B}(y')$ relative to green in the second information and shift amounts of red $B_{2R}(y')$ relative to green in the second information are derived as follows:

$$B_{2B}(y')=K \times A_{2B}(y'/K)+C_{2B}(y')$$

$$B_{2R}(y')=K \times A_{2R}(y'/K)+C_{2R}(y'),$$

where K represents a predetermined constant that is set in advance to the computing unit, y' represents the image height on the image plane of the image pickup optical system with the attachment optical system mounted onto the image pickup optical system, or an image plane of the image pickup apparatus that comprises an optical system configured to change a focal length of the image pickup optical system, $A_{2B}(y')$ and $A_{2R}(y')$ represent the shift amounts of blue and red relative to green in the first information, and $C_{2B}(y')$ and $C_{2R}(y')$ represent functions that have y' as a variable.

3. An attachment optical system according to claim 1, wherein the constant K is allowed to be changed to an arbitrary value.

4. An attachment optical system according to claim 2, wherein the constant K is allowed to be changed to an arbitrary value.

5. An attachment optical system according to claim 1, wherein, when the receiver does not receive the first information $A_{1B}(r)$ and $A_{1R}(r)$, the computing unit derives the second information $B_{1B}(r)$ and $B_{1R}(r)$ as follows:

$$B_{1B}(r)=C_{1B}(r)$$

$$B_{1R}(r)=C_{1R}(r)$$

6. An attachment optical system according to claim 2, wherein, when the receiver does not receive the first information $A_{2B}(y)$ and $A_{2R}(y)$, the computing unit derives the second information $B_{2B}(y)$ and $B_{2R}(y)$ as follows:

$$B_{2B}(y')=C_{2B}(y')$$

$$B_{2R}(y')=C_{2R}(y')$$

7. An attachment optical system according to claim 1, further comprising a memory configured to store the second information.

8. An attachment optical system according to claim 2, further comprising a memory configured to store the second information.

9. An image pickup system, comprising an image pickup optical system, the attachment optical system of claim 1, and an image pickup element, which are arranged from an object side to an image side in order, wherein the following conditional expression is satisfied, $$0.8 < K \times f1/f2 < 1.2$$

where f1 represents a focal length of the image pickup optical system at a wide angle end and f2 represents a focal length of the image pickup system at a wide angle end.

10. An image pickup system, comprising an image pickup optical system, the attachment optical system of claim 2, and an image pickup element, which are arranged from an object side to an image side in order, wherein the following conditional expression is satisfied, $$0.8 < K \times f1/f2 < 1.2$$

where f1 represents a focal length of the image pickup optical system at a wide angle end and f2 represents a focal length of the image pickup system at a wide angle end.

11. An image pickup apparatus, comprising a focal length changing optical system between an image pickup optical system and an image pickup element, the focal length changing optical system being configured to change a focal length of the image pickup optical system, the image pickup optical system being detachable, the image pickup apparatus further comprising:

a receiver configured to receive first information for correcting lateral chromatic aberrations that are caused by the image pickup optical system; and a computing unit configured to derive, based on the first information and optical characteristics of the focal length changing optical system, second information for correcting lateral chromatic aberrations, wherein the first information and the second information comprise information for obtaining lateral chromatic aberration amounts under conditions regarding a zoom position, focus position, and f-number of the image pickup optical system, based on a ratio of an image height to be corrected on an image plane to a maximum image height, wherein the first information and the second information each indicate shift amounts of blue and red relative to green in a radial direction of a circle centered about an optical axis position, and wherein the shift amount of blue $B_{1B}(r)$ relative to green in the second information, and the shift amount of red $B_{1R}(r)$ relative to green in the second information are derived as follows:

$$B_{1B}(r)=K \times A_{1B}(r)+C_{1B}(r)$$

$$B_{1R}(r)=K \times A_{1R}(r)+C_{1R}(r)$$

where K represents a predetermined constant that is set in advance to the computing unit, r represents the ratio of the image height to be corrected on the image plane to the maximum image height, $A_{1B}(r)$ represents the shift amount of blue relative to green in the first information, $A_{1R}(r)$ represents the shift amount of red relative to green in the first information and $C_{1B}(r)$ and $C_{1R}(r)$ represent functions that have r as a variable.

12. An image pickup apparatus comprising a focal length changing optical system between an image pickup optical system and an image pickup element, the focal length changing optical system being configured to change a focal length of the image pickup optical system, the image pickup optical system being detachable, the image pickup apparatus further comprising:

a receiver configured to receive first information for correcting lateral chromatic aberrations that are caused by the image pickup optical system; and a computing unit configured to derive, based on the first information and optical characteristics of the focal length changing optical system, second information for correcting lateral chromatic aberrations, wherein the first information comprises information for obtaining lateral chromatic aberration amounts under conditions regarding a zoom position, focus position, and f-number of the image pickup optical system, based on an image height on an image plane of the image pickup optical system, wherein the second information comprises lateral chromatic aberration amounts that are expressed based on an image height on an image plane of the image pickup optical system with the focal length changing optical system mounted onto the image pickup optical system, wherein the first information and the second information each indicate shift amounts of blue and red relative to green in a radial direction of a circle centered about an optical axis position, and wherein the shift amount of blue $B_{2B}(y')$ relative to green in the second information and the shift amount of red $B_{2R}(y')$ relative to green in the second information are derived as follows:

$$B_{2B}(y')=K \times A_{2B}(y'/K)+C_{2B}(y')$$

$$B_{2R}(y')=K \times A_{2R}(y'/K)+C_{2R}(y')$$

where K represents a predetermined constant that is set in advance to the computing unit, y' represents the image height on the image plane of the image pickup optical system with the attachment optical system mounted onto the image pickup optical system, or an image plane of the image pickup apparatus that comprises the focal length changing optical system configured to change the focal length of the image pickup optical system, $A_{2B}(y')$ and $A_{2R}(y')$ respectively represent the shift amounts of blue and red relative to green in the first information, and $C_{2B}(y')$ and $C_{2R}(y')$ represent functions that have y' as a variable.

13. An image pickup apparatus according to claim 11, wherein the constant K is allowed to be changed to an arbitrary value.

14. An image pickup apparatus according to claim 12, wherein the constant K is allowed to be changed to an arbitrary value.

15. An image pickup apparatus according to claim 11, wherein, when the receiver does not receive the first information $A_{1B}(r)$ and $A_{1R}(r)$, the computing unit derives the second information $B_{1B}(r)$ and $B_{1R}(r)$ as follows:

$$B_{1B}(r)=C_{1B}(r)$$

$$B_{1R}(r)=C_{1R}(r)$$

16. An image pickup apparatus according to claim 12, wherein, when the receiver does not receive the first information $A_{2B}(y)$ and $A_{2R}(y)$, the computing unit derives the second information $B_{2B}(y)$ and $B_{2R}(y)$ as follows:

$$B_{2B}(y')=C_{2B}(y')$$

$$B_{2R}(y')=C_{2R}(y')$$

17. An image pickup apparatus according to claim 11, further comprising a memory configured to store the second information.

18. An image pickup apparatus according to claim 12, further comprising a memory configured to store the second information.

19. An image pickup system, comprising an image pickup optical system, the focal length changing optical system configured to change the focal length of the image pickup optical system of claim 11, and an image pickup element, which are arranged from an object side to an image side in order, wherein the following conditional expression is satisfied, $$0.8 < K \times f1/f2 < 1.2$$

where f1 represents a focal length of the image pickup optical system at a wide angle end and f2 represents a focal length of the image pickup system at a wide angle end.

20. An image pickup system, comprising an image pickup optical system, the focal length changing optical system configured to change the focal length of the image pickup optical system of claim 12, and an image pickup element, which are arranged from an object side to an image side in order, wherein the following conditional expression is satisfied, $$0.8 < K \times f1/f2 < 1.2$$

where f1 represents a focal length of the image pickup optical system at a wide angle end and f2 represents a focal length of the image pickup system at a wide angle end.

* * * * *